(12) United States Patent
McMasters et al.

(10) Patent No.: US 8,806,871 B2
(45) Date of Patent: Aug. 19, 2014

(54) FUEL NOZZLE

(75) Inventors: Marie Ann McMasters, Mason, OH (US); Michael A. Benjamin, Cincinnati, OH (US); Alfred Mancini, Cincinnati, OH (US); Steven Joseph Lohmueller, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 809 days.

(21) Appl. No.: 12/412,512

(22) Filed: Mar. 27, 2009

(65) Prior Publication Data

US 2009/0255262 A1   Oct. 15, 2009

Related U.S. Application Data

(60) Provisional application No. 61/044,116, filed on Apr. 11, 2008.

(51) Int. Cl.
    *F23R 3/28* (2006.01)
(52) U.S. Cl.
    USPC .................................. 60/742; 60/740; 60/748
(58) Field of Classification Search
    USPC .................... 60/740, 742, 748, 737, 746, 747
    See application file for complete search history.

(56) References Cited

U.S. PATENT DOCUMENTS

| | | |
|---|---|---|
| 1,908,066 A | 5/1933 | Sedlmeir |
| 3,258,838 A | 7/1966 | Tilton, Jr. |
| 3,684,186 A | 8/1972 | Helmrich |
| 4,798,330 A | 1/1989 | Mancini et al. |
| 5,057,073 A | 10/1991 | Martin |
| 5,460,758 A | 10/1995 | Langer et al. |
| 5,713,205 A * | 2/1998 | Sciocchetti et al. ............ 60/740 |
| 5,824,250 A | 10/1998 | Whalen et al. |
| 5,988,531 A | 11/1999 | Maden et al. |
| 6,269,540 B1 | 8/2001 | Islam et al. |
| 6,321,541 B1 | 11/2001 | Wrubel et al. |
| 6,355,086 B2 * | 3/2002 | Brown et al. .................... 75/235 |
| 6,363,726 B1 | 4/2002 | Durbin et al. |
| 6,367,262 B1 | 4/2002 | Mongia et al. |
| 6,381,964 B1 | 5/2002 | Pritchard, Jr. et al. |
| 6,389,815 B1 | 5/2002 | Hura et al. |
| 6,391,251 B1 | 5/2002 | Keicher et al. |
| 6,442,940 B1 | 9/2002 | Young et al. |
| 6,478,239 B2 * | 11/2002 | Chung et al. .................. 239/398 |

(Continued)

FOREIGN PATENT DOCUMENTS

| | | |
|---|---|---|
| EP | 0837284 A2 | 4/1998 |
| EP | 1045202 A1 | 10/2000 |

(Continued)

OTHER PUBLICATIONS

U.S. Appl. No. 11/365,428, filed Mar. 1, 2006.

(Continued)

*Primary Examiner* — Gerald L Sung
*Assistant Examiner* — Michael B Mantyla
(74) *Attorney, Agent, or Firm* — William Scott Andes; Trego, Hines & Ladenheim, PLLC

(57) ABSTRACT

A fuel nozzle for a gas turbine engine is disclosed, the fuel nozzle comprising at least one unitary component made using a rapid manufacturing process. In one aspect, the rapid manufacturing process is a laser sintering process. Unitary components disclosed include a conduit, swirler, distributor, venturi and a centerbody.

9 Claims, 17 Drawing Sheets

(56) References Cited

U.S. PATENT DOCUMENTS

| | | | |
|---|---|---|---|
| 6,523,350 B1 | 2/2003 | Mancini et al. | |
| 6,546,732 B1 * | 4/2003 | Young et al. | 60/772 |
| 6,634,175 B1 | 10/2003 | Kawata et al. | |
| 6,672,066 B2 | 1/2004 | Wrubel et al. | |
| 6,676,892 B2 * | 1/2004 | Das et al. | 419/7 |
| 6,705,383 B2 | 3/2004 | Beeck et al. | |
| 6,711,898 B2 | 3/2004 | Laing et al. | |
| 6,718,770 B2 | 4/2004 | Laing et al. | |
| 6,811,744 B2 | 11/2004 | Keicher et al. | |
| 6,839,607 B2 | 1/2005 | Wooten | |
| 6,865,889 B2 | 3/2005 | Mancini et al. | |
| 6,898,938 B2 * | 5/2005 | Mancini et al. | 60/748 |
| 6,951,227 B1 | 10/2005 | Su | |
| 6,976,363 B2 | 12/2005 | McMasters et al. | |
| 7,056,095 B1 | 6/2006 | Gigas et al. | |
| 7,062,920 B2 | 6/2006 | McMasters et al. | |
| 7,121,095 B2 | 10/2006 | McMasters et al. | |
| 7,415,826 B2 | 8/2008 | McMasters et al. | |
| 7,464,553 B2 | 12/2008 | Hsieh et al. | |
| 7,506,510 B2 | 3/2009 | Thomson | |
| 7,531,123 B2 | 5/2009 | Dietrich et al. | |
| 7,565,803 B2 | 7/2009 | Li et al. | |
| 7,572,524 B2 * | 8/2009 | Sabol et al. | 428/701 |
| 7,581,396 B2 | 9/2009 | Hsieh et al. | |
| 7,654,000 B2 * | 2/2010 | Prociw et al. | 29/890.142 |
| 7,665,306 B2 * | 2/2010 | Bronson et al. | 60/752 |
| 7,712,313 B2 * | 5/2010 | Kojovic et al. | 60/740 |
| 7,788,927 B2 | 9/2010 | McMasters et al. | |
| 7,810,237 B2 | 10/2010 | Lange et al. | |
| 7,841,368 B2 | 11/2010 | McMasters et al. | |
| 8,256,221 B2 * | 9/2012 | Rubio et al. | 60/723 |
| 8,316,541 B2 * | 11/2012 | Patel et al. | 29/889.22 |
| 2002/0085941 A1 * | 7/2002 | Deevi et al. | 419/6 |
| 2002/0129606 A1 | 9/2002 | Wrubel et al. | |
| 2005/0205232 A1 * | 9/2005 | Wang et al. | 164/361 |
| 2006/0248898 A1 | 11/2006 | Buelow et al. | |
| 2007/0017224 A1 | 1/2007 | Li et al. | |
| 2007/0028595 A1 | 2/2007 | Mongia et al. | |
| 2007/0028617 A1 | 2/2007 | Hsieh et al. | |
| 2007/0028618 A1 | 2/2007 | Hsiao et al. | |
| 2007/0028620 A1 | 2/2007 | McMasters et al. | |
| 2007/0028624 A1 | 2/2007 | Hsieh et al. | |
| 2007/0071902 A1 | 3/2007 | Dietrich et al. | |
| 2007/0084047 A1 | 4/2007 | Lange et al. | |
| 2007/0098929 A1 | 5/2007 | Dietrich et al. | |
| 2007/0119177 A1 | 5/2007 | McMasters et al. | |
| 2007/0141375 A1 * | 6/2007 | Budinger et al. | 428/548 |
| 2007/0163114 A1 * | 7/2007 | Johnson | 29/889.2 |
| 2007/0163263 A1 | 7/2007 | Thomson | |
| 2009/0255102 A1 | 10/2009 | McMasters et al. | |
| 2009/0255116 A1 | 10/2009 | McMasters et al. | |
| 2009/0255118 A1 | 10/2009 | Kastrup et al. | |
| 2009/0255119 A1 | 10/2009 | McMasters et al. | |
| 2009/0255120 A1 | 10/2009 | McMasters et al. | |
| 2009/0255256 A1 | 10/2009 | McMasters et al. | |
| 2009/0255257 A1 | 10/2009 | McMasters et al. | |
| 2009/0255259 A1 | 10/2009 | Kastrup et al. | |
| 2009/0255260 A1 | 10/2009 | McMasters et al. | |
| 2009/0255261 A1 | 10/2009 | McMasters et al. | |
| 2009/0255264 A1 | 10/2009 | McMasters et al. | |
| 2009/0255265 A1 | 10/2009 | McMasters et al. | |
| 2009/0256003 A1 | 10/2009 | McMasters et al. | |
| 2009/0256007 A1 | 10/2009 | McMasters et al. | |
| 2010/0065142 A1 | 3/2010 | McMasters et al. | |

FOREIGN PATENT DOCUMENTS

| | | |
|---|---|---|
| EP | 1108958 A1 | 6/2001 |
| EP | 1286111 A2 | 2/2003 |
| EP | 1408280 A2 | 4/2004 |
| EP | 1471308 A1 | 10/2004 |
| EP | 1508743 A2 | 2/2005 |
| EP | 1793169 A2 | 6/2007 |
| FR | 2896303 A1 | 7/2007 |
| GB | 2022811 A | 12/1979 |
| JP | 2003129862 A | 5/2003 |
| JP | 2003214300 A | 7/2003 |
| JP | 2005106411 A | 4/2005 |
| JP | 2006524579 A | 11/2006 |
| JP | 2007155318 A | 6/2007 |
| JP | 2008069449 A | 3/2008 |
| WO | 98/55800 A1 | 12/1998 |
| WO | 01/40710 A1 | 6/2001 |
| WO | 2004096487 A1 | 11/2004 |

OTHER PUBLICATIONS

PCT Search Report and Written Opinion dated Feb. 7, 2012 from corresponding Application No. PCT/US2009/037224.

PCT Search Report and Written Opinion dated Mar. 20, 2012 from corresponding Application No. PCT/US2009/037221.

PCT Search Report and Written Opinion dated Mar. 20, 2012 from corresponding Application No. PCT/US2009/037148.

PCT Search Report and Written Opinion dated Mar. 13, 2012 from corresponding Application No. PCT/US2009/037101.

PCT Invitation to Pay Additional Fees dated Feb. 6, 2012 from corresponding Application No. PCT/US2009/039085.

PCT Search Report and Written Opinion dated Feb. 6, 2012 from corresponding Application No. PCT/US2009/039100.

PCT Search Report and Written Opinion dated Mar. 8, 2012 from corresponding Application No. PCT/US2009/039694.

Liu, H.-C., Lee, S., Kang, S., Edwards, C. F., Prinz, F. B., "RP of Si3 N4 burner arrays via assembly mould SDM", Rapid Prototyping Journal, Emerald Group Publishing Ltd., 2004, vol. 10, Issue 4, pp. 239-246.

Office Action from JP Application No. 2011-504059 dated May 28, 2013, along with unofficial English translation.

* cited by examiner

FUEL NOZZLE

CROSS-REFERENCE TO RELATED APPLICATIONS

This Application claims priority to U.S. Provisional Application Ser. No. 61/044,116, filed Apr. 11, 2008, which is herein incorporated by reference in its entirety.

BACKGROUND OF THE INVENTION

This invention relates generally to fuel nozzles, and more specifically fuel nozzle assemblies having unitary components coupled using brazing for use in gas turbine engines.

Turbine engines typically include a plurality of fuel nozzles for supplying fuel to the combustor in the engine. The fuel is introduced at the front end of a burner in a highly atomized spray from a fuel nozzle. Compressed air flows around the fuel nozzle and mixes with the fuel to form a fuel-air mixture, which is ignited by the burner. Because of limited fuel pressure availability and a wide range of required fuel flow, many fuel injectors include pilot and main nozzles, with only the pilot nozzles being used during start-up, and both nozzles being used during higher power operation. The flow to the main nozzles is reduced or stopped during start-up and lower power operation. Such injectors can be more efficient and cleaner-burning than single nozzle fuel injectors, as the fuel flow can be more accurately controlled and the fuel spray more accurately directed for the particular combustor requirement. The pilot and main nozzles can be contained within the same nozzle assembly or can be supported in separate nozzle assemblies. These dual nozzle fuel injectors can also be constructed to allow further control of the fuel for dual combustors, providing even greater fuel efficiency and reduction of harmful emissions. The temperature of the ignited fuel-air mixture can reach an excess of 3500° F. (1920° C.). It is therefore important that the fuel supply conduits, flow passages and distribution systems are substantially leak free and are protected from the flames and heat.

Over time, continued exposure to high temperatures during turbine engine operations may induce thermal gradients and stresses in the conduits and fuel nozzle components which may damage the conduits or fuel nozzle components and may adversely affect the operation of the fuel nozzle. For example, thermal gradients may cause fuel flow reductions in the conduits and may lead to excessive fuel maldistribution within the turbine engine. Exposure of fuel flowing through the conduits and orifices in a fuel nozzle to high temperatures may lead to coking of the fuel and lead to blockages and non-uniform flow. To provide low emissions, modern fuel nozzles require numerous, complicated internal air and fuel circuits to create multiple, separate flame zones. Fuel circuits may require heat shields from the internal air to prevent coking, and certain fuel nozzle components may have to be cooled and shielded from combustion gases. Additional features may have to be provided in the fuel nozzle components to promote heat transfer and cooling. Furthermore, over time, continued operation with damaged fuel nozzles may result in decreased turbine efficiency, turbine component distress, and/or reduced engine exhaust gas temperature margin.

Improving the life cycle of fuel nozzles installed within the turbine engine may extend the longevity of the turbine engine. Known fuel nozzles include a delivery system, a mixing system, and a support system. The delivery system comprising conduits for transporting fluids delivers fuel to the turbine engine and is supported, and is shielded within the turbine engine, by the support system. More specifically, known support systems surround the delivery system, and as such are subjected to higher temperatures and have higher operating temperatures than delivery systems which are cooled by fluid flowing through the fuel nozzle. It may be possible to reduce the thermal stresses in the conduits and fuel nozzles by configuring their external and internal contours and thicknesses. Some known conventional fuel nozzles have 22 braze joints and 3 weld joints.

Fuel nozzles have swirler assemblies that swirl the air passing through them to promote mixing of air with fuel prior to combustion. The swirler assemblies used in the combustors may be complex structures having axial, radial or conical swirlers or a combination of them. In the past, conventional manufacturing methods have been used to fabricate mixers having separate venturi and swirler components that are assembled or joined together using known methods to form assemblies. For example, in some mixers with complex vanes, individual vanes are first machined and then brazed into an assembly. Investment casting methods have been used in the past in producing some combustor swirlers. Other swirlers and venturis have been machined from raw stock. Electro-discharge machining (EDM) has been used as a means of machining the vanes in conventional fuel nozzle components.

Conventional gas turbine engine components such as, for example, fuel nozzles and their associated swirlers, conduits, distribution systems, venturis and mixing systems are generally expensive to fabricate and/or repair because the conventional fuel nozzle designs having complex swirlers, conduits and distribution circuits and venturis for transporting, distributing and mixing fuel with air include a complex assembly and joining of more than thirty components. More specifically, the use of braze joints can increase the time needed to fabricate such components and can also complicate the fabrication process for any of several reasons, including: the need for an adequate region to allow for braze alloy placement; the need for minimizing unwanted braze alloy flow; the need for an acceptable inspection technique to verify braze quality; and, the necessity of having several braze alloys available in order to prevent the re-melting of previous braze joints. Moreover, numerous braze joints may result in several braze runs, which may weaken the parent material of the component. Modern fuel nozzles such as the Twin Annular Pre Swirl (TAPS) nozzles have numerous components and braze joints in a tight envelope. The presence of numerous braze joints can undesirably increase the weight and the cost of manufacturing and inspection of the components and assemblies.

Accordingly, it would be desirable to have a fuel nozzle having unitary components having complex geometries for mixing fuel and air in fuel nozzles while protecting the structures from heat for reducing undesirable effects from thermal exposure described earlier. It is desirable to have a fuel nozzle assembly having assembly features to reduce the cost and for ease of assembly as well as providing protection from adverse thermal environment and for reducing potential leakage. It is desirable to have a method of assembly of unitary components having complex three-dimensional geometries, such as, for example, a distributor, a swirler and a venturi with a heat shield for use in fuel nozzles having reduced potential for leakage in a gas turbine engine. It is desirable to have a method of manufacturing unitary components having complex three-dimensional geometries for use in fuel nozzles.

BRIEF DESCRIPTION OF THE INVENTION

The above-mentioned need or needs may be met by exemplary embodiments which provide a fuel nozzle comprising at least one unitary component made using a rapid manufacturing process. In one aspect, the rapid manufacturing process is a laser sintering process. In another aspect, the fuel nozzle comprises a unitary conduit. In another aspect, the fuel nozzle comprises a unitary swirler having an adaptor. In another aspect, the fuel nozzle comprises a unitary distributor having a plurality of passages. In another aspect, the fuel nozzle comprises a unitary venturi. In another aspect, the fuel nozzle comprises a unitary centerbody.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
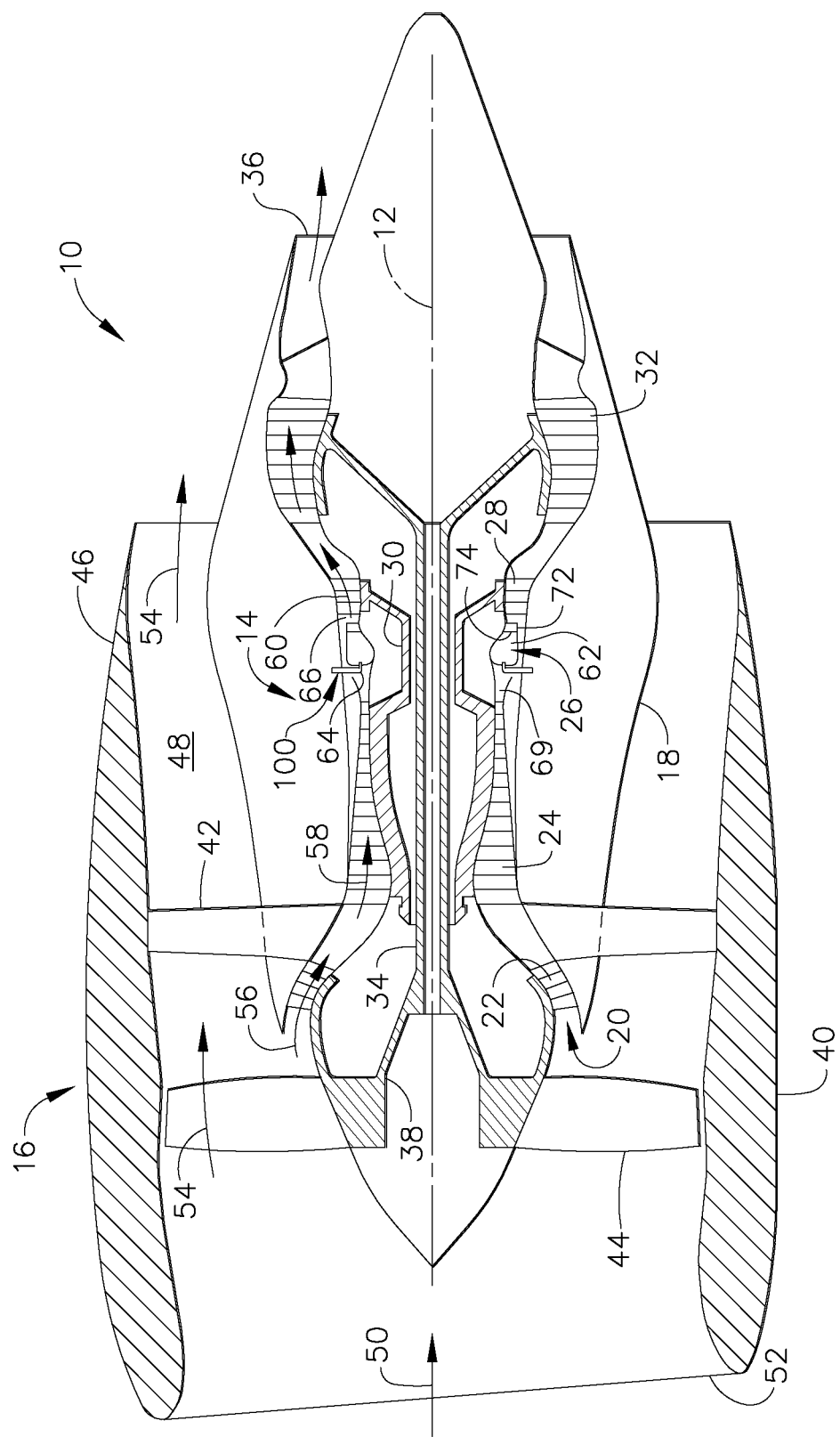
FIG. 1 is a diagrammatic view of a high bypass turbofan gas turbine engine comprising an exemplary fuel nozzle according to an exemplary embodiment of the present invention.

Referring now to the drawings in detail, wherein identical numerals indicate the same elements throughout the figures, FIG. 1 shows in diagrammatic form an exemplary gas turbine engine 10 (high bypass type) incorporating an exemplary fuel nozzle 100 having unitary components (such as conduit 80, swirler 200, distributor 300, centerbody 450 and venturi 500, shown in the figures and described herein) used for promoting mixing of air with the fuel in the fuel nozzle 100. The exemplary gas turbine engine 10 has an axial longitudinal centerline axis 12 therethrough for reference purposes. Engine 10 preferably includes a core gas turbine engine generally identified by numeral 14 and a fan section 16 positioned upstream thereof. Core engine 14 typically includes a generally tubular outer casing 18 that defines an annular inlet 20. Outer casing 18 further encloses and supports a booster 22 for raising the pressure of the air that enters core engine 14 to a first pressure level. A high pressure, multi-stage, axial-flow compressor 24 receives pressurized air from booster 22 and further increases the pressure of the air. The pressurized air flows to a combustor 26, where fuel is injected into the pressurized air stream and ignited to raise the temperature and energy level of the pressurized air. The high energy combustion products flow from combustor 26 to a first (high pressure) turbine 28 for driving the high pressure compressor 24 through a first (high pressure) drive shaft 30, and then to a second (low pressure) turbine 32 for driving booster 22 and fan section 16 through a second (low pressure) drive shaft 34 that is coaxial with first drive shaft 30. After driving each of turbines 28 and 32, the combustion products leave core engine 14 through an exhaust nozzle 36 to provide at least a portion of the jet propulsive thrust of the engine 10.

Fan section 16 includes a rotatable, axial-flow fan rotor 38 that is surrounded by an annular fan casing 40. It will be appreciated that fan casing 40 is supported from core engine 14 by a plurality of substantially radially-extending, circumferentially-spaced outlet guide vanes 42. In this way, fan casing 40 encloses fan rotor 38 and fan rotor blades 44. Downstream section 46 of fan casing 40 extends over an outer portion of core engine 14 to define a secondary, or bypass, airflow conduit 48 that provides additional jet propulsive thrust.

From a flow standpoint, it will be appreciated that an initial airflow, represented by arrow 50, enters gas turbine engine 10 through an inlet 52 to fan casing 40. Air flow 50 passes through fan blades 44 and splits into a first compressed air flow (represented by arrow 54) that moves through conduit 48 and a second compressed air flow (represented by arrow 56) which enters booster 22.

The pressure of second compressed air flow 56 is increased and enters high pressure compressor 24, as represented by arrow 58. After mixing with fuel and being combusted in combustor 26, combustion products 60 exit combustor 26 and flow through first turbine 28. Combustion products 60 then flow through second turbine 32 and exit exhaust nozzle 36 to provide at least a portion of the thrust for gas turbine engine 10.

The combustor 26 includes an annular combustion chamber 62 that is coaxial with longitudinal centerline axis 12, as well as an inlet 64 and an outlet 66. As noted above, combustor 26 receives an annular stream of pressurized air from a high pressure compressor discharge outlet 69. A portion of this compressor discharge air ("CDP" air) identified by the numeral 190 in the figures herein, flows into a mixer (not shown). Fuel is injected from a fuel nozzle tip assembly 68 to mix with the air and form a fuel-air mixture that is provided to combustion chamber 62 for combustion. Ignition of the fuel-air mixture is accomplished by a suitable igniter, and the resulting combustion gases 60 flow in an axial direction toward and into an annular, first stage turbine nozzle 72.

Nozzle 72 is defined by an annular flow channel that includes a plurality of radially-extending, circumferentially-spaced nozzle vanes 74 that turn the gases so that they flow angularly and impinge upon the first stage turbine blades of first turbine 28. As shown in FIG. 1, first turbine 28 preferably rotates high pressure compressor 24 via first drive shaft 30. Low pressure turbine 32 preferably drives booster 24 and fan rotor 38 via second drive shaft 34.

Combustion chamber 62 is housed within engine outer casing 18. Fuel is supplied into the combustion chamber by fuel nozzles 100, such as for example shown in FIGS. 2 and 3. Liquid fuel is transported through conduits 80 within a stem 83, such as, for example, shown in FIG. 3, to the fuel nozzle tip assembly 68. Conduits that have a unitary construction may be used for transporting the liquid fuel into the fuel nozzle tip assembly 68 of the fuel nozzles 100. The fuel supply conduits, may be located within the stem 83 and coupled to a fuel distributor tip 180. Pilot fuel and main fuel are sprayed into the combustor 26 by fuel nozzle tip assemblies 68, such as for example, shown in FIGS. 2, 3 and 4. During operation of the turbine engine, initially, pilot fuel is supplied through a pilot fuel flow passage, such as, for example, shown as items 82, 84 in FIG. 3, during pre-determined engine operation conditions, such as during startup and idle operations. The pilot fuel is discharged from fuel distributor tip 180 through the pilot fuel outlet 162. When additional power is demanded, main fuel is supplied through main fuel passageways 85 (see FIG. 3) and the main fuel is sprayed using the main fuel outlets 165.

Figure 3:
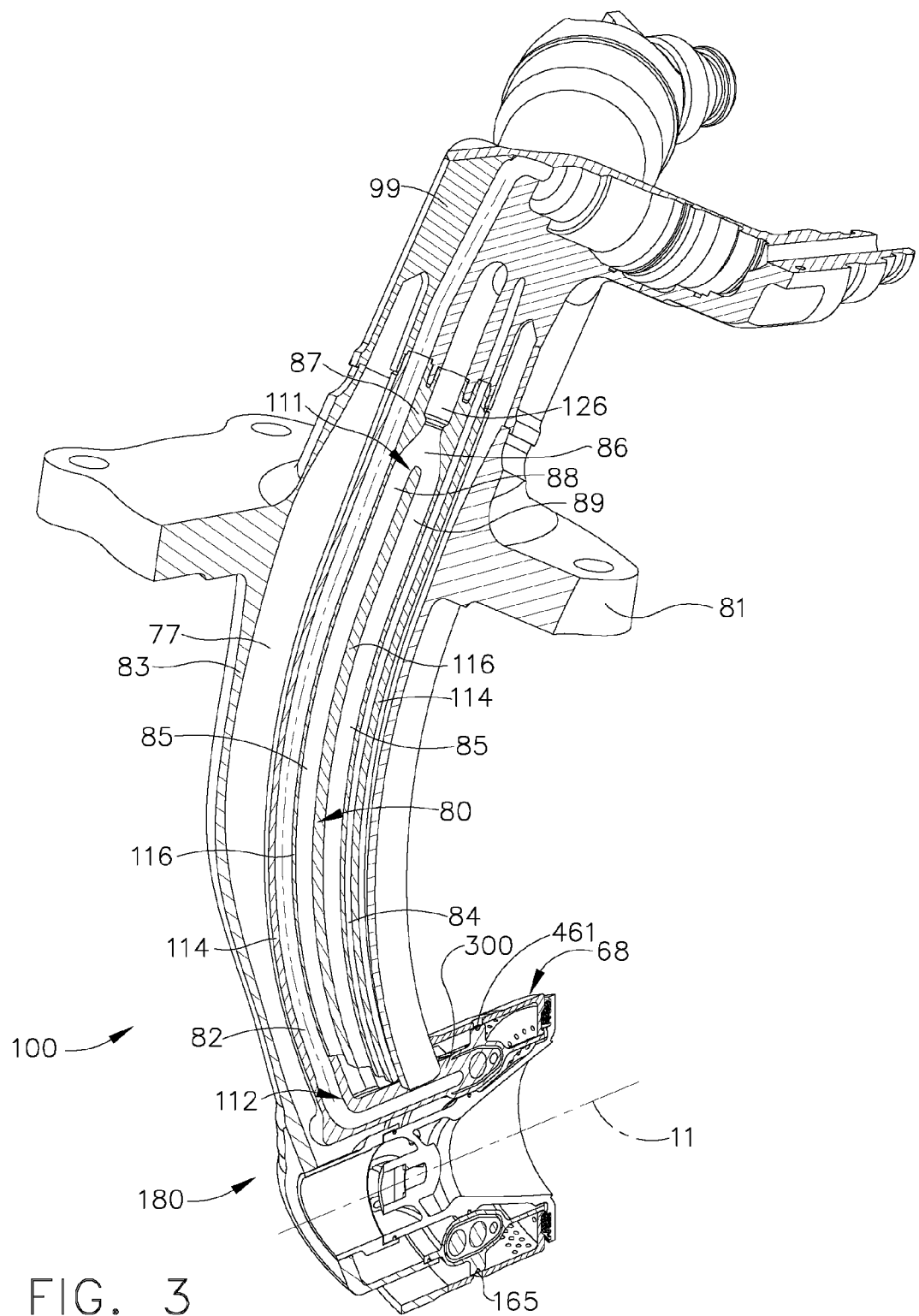
FIG. 3 is a partial cross-sectional view of exemplary fuel nozzle according to an exemplary embodiment of the present invention.

FIG. 3 is a partial cross-sectional isometric view of an exemplary fuel nozzle 100 having a unitary conduit 85 used for transporting liquid fuel in a fuel nozzle tip 68. In the exemplary embodiment, the unitary conduit 80 includes a flow passage 86 located within the conduit body 87 which serves as the main fuel passageway into the fuel nozzle, and a pilot fuel passages 82, 84 extending within the conduit body 87. Fuel from the pilot fuel passages is directed into the fuel nozzle tip 68 by a pilot supply tube 154 (see FIG. 3) and exits through a pilot fuel outlet 162. In some unitary conduits 80, it is advantageous to have a flow passage 86 that branches into two or more sub-passages 88, 89, such as, shown for example, in FIG. 3. As shown in FIG. 3 for a fuel nozzle 100 application of the unitary conduit 80, the flow passage 86 branches into a first main passage 88 and a second main passage 89. Liquid fuel is supplied into the nozzle through a main passage inlet 126 and enters the flow passage 86. The fuel flow then branches into the two streams, one through the first main passage 88 and the other through the second main passage 89, before entering the distributor tip 180. As shown in FIG. 3, the main fuel passageway 86, the sub-passages 88, 89, and the pilot fuel passageways 82, 84 extend in a generally longitudinal direction in the unitary conduit 80.

An exemplary fuel distributor 100 having a unitary conduit 80 as described herein and used in a gas turbine engine fuel nozzle is shown in FIG. 3. In the exemplary embodiment, a unitary conduit 80 is located within a stem 83 which has a flange 81 for mounting in a gas turbine engine 10. The unitary conduit 80 is located within the stem 83 such that there is a gap 77 between the interior of the stem and the conduit body 80 of the unitary conduit 80. The gap 77 insulates the unitary conduit 80 from heat and other adverse environmental conditions surrounding the fuel nozzle in gas turbine engines. Additional cooling of the unitary conduit 80 may be accomplished by circulating air in the gap 77. The unitary conduit 80 is attached to the stem 83 using conventional attachment means such as brazing. Alternatively, the unitary conduit 80 and the stem 83 may be made by rapid manufacturing methods such as for example, direct laser metal sintering, described herein. In the exemplary embodiment of a fuel nozzle 100 shown and described herein, fuel distributor tip 68 extends from the unitary conduit 80 and stem 83 such that main fuel passageways (first main passage 88 and the second main passage 89) and the pilot fuel passageways 82, 84 are coupled in flow communication with a fuel distributor 300, such as, for example, shown in FIG. 3. Specifically, main fuel passageways 88, 89 are coupled in flow communication to main fuel circuits defined within fuel distributor 300. Likewise, primary pilot passage 82 and secondary pilot passage 84 are coupled in flow communication with corresponding pilot injectors (see, for example, items 163, 164 shown in FIG. 4) positioned radially inward within a fuel nozzle. It will be apparent to those skilled in the art that, although the conduit 80 and the distributor ring 171 have been described herein above as a unitary conduit (i.e., having a unitary construction), it is possible to use conduits 80 having other suitable manufacturing constructs using methods known in the art. The unitary distributor ring 171 is attached to the stem 83 using conventional attachment means such as brazing. Alternatively, the unitary distributor ring 171 and the stem 83 may be made by rapid manufacturing methods such as for example, direct laser metal sintering, described herein.

Figure 2:
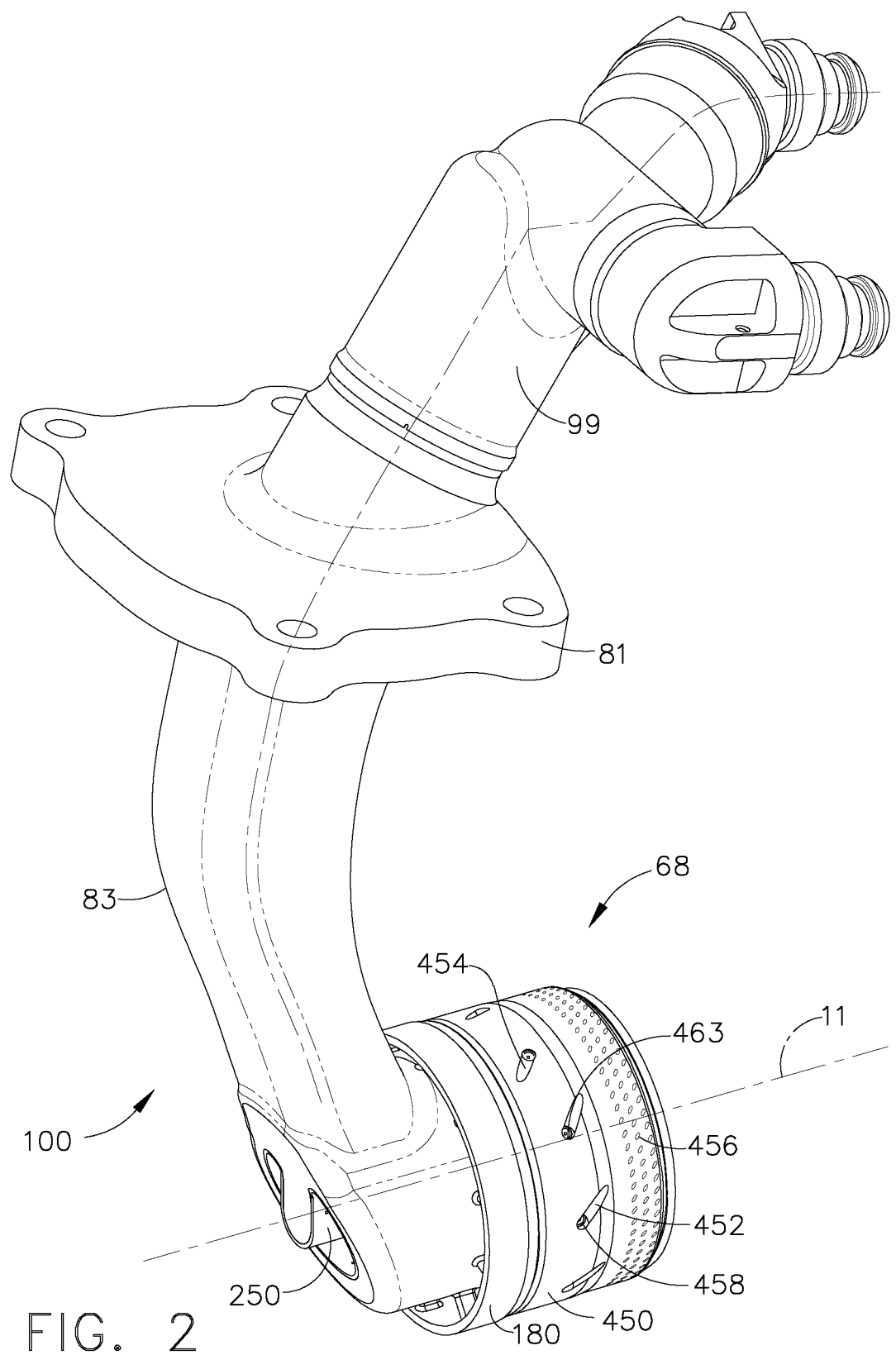
FIG. 2 is an isometric view of an exemplary fuel nozzle according to an exemplary embodiment of the present invention.
Figure 4:
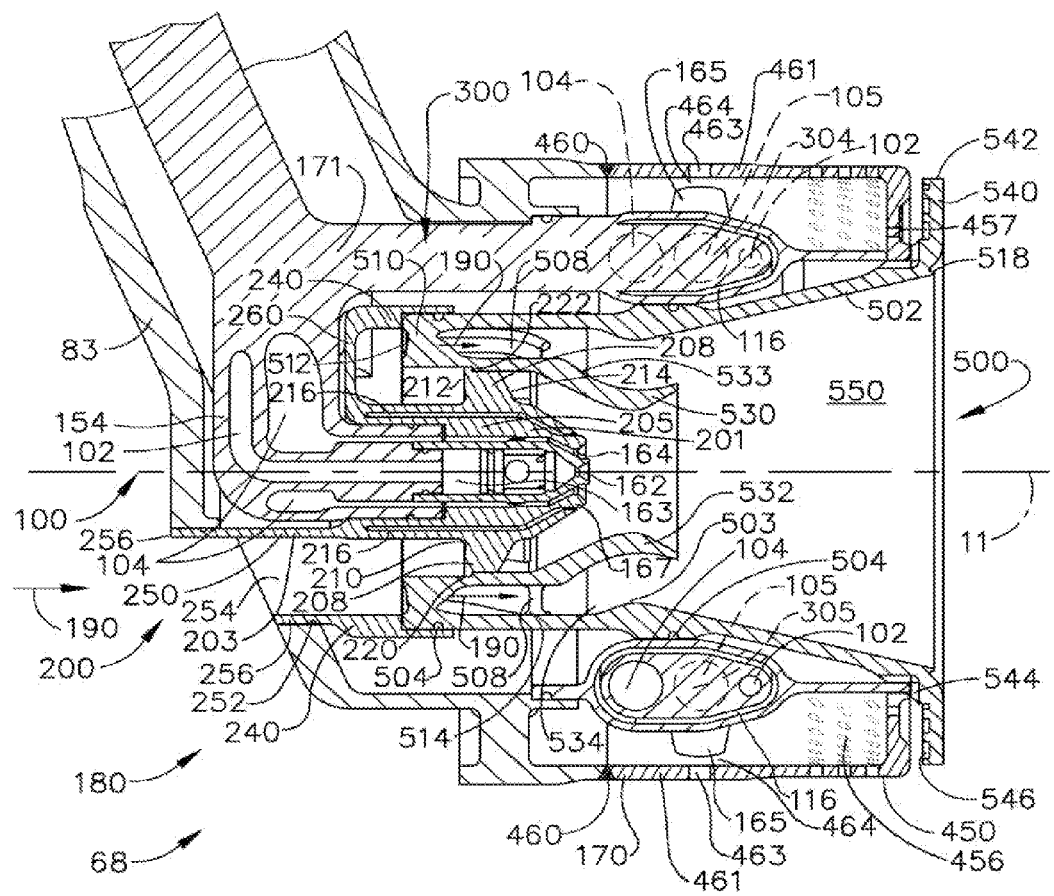
FIG. 4 is an axial cross sectional view of the tip region of the exemplary fuel nozzle shown in FIG. 2.

FIG. 4 shows an axial cross-sectional view of the exemplary fuel nozzle tip assembly 68 of the exemplary fuel nozzle 100 shown in FIGS. 1, 2 and 3. The exemplary nozzle tip assembly 68 comprises a distributor 300 which receives the fuel flow from the supply conduit 80, such as described previously, and distributes the fuel to various locations in the fuel nozzle tip 68, such as main fuel passages and pilot fuel passages. FIGS. 3 and 4 show exemplary embodiments of the present invention having two main flow passages 304, 305 and two pilot flow passages 102, 104 that distribute the fuel in a fuel nozzle tip assembly 68.

The exemplary distributor 300 shown in FIGS. 4 comprises a distributor ring body 171 that contains the main flow passages and pilot flow passages described herein. The main flow passages 304, 305 in the distributor 300 are in flow communication with corresponding main flow passages (such as, for example, shown as items 88, 89 in FIG. 3) in the supply conduit 80. The exemplary main fuel passages shown and described herein each comprise an inlet portion that transport the fuel flow from the supply conduit 80 to two arcuate portions 304, 305 that are located circumferentially around a distributor axis 11.

The term "unitary" is used in this application to denote that the associated component, such as, for example, a venturi 500 described herein, is made as a single piece during manufacturing. Thus, a unitary component has a monolithic construction for the component.

FIG. 4 shows an axial cross section of an exemplary fuel nozzle tip 68 of an exemplary embodiment of the present invention of a fuel nozzle assembly 100. The exemplary fuel nozzle tip 68 shown in FIG. 4 has two pilot fuel flow passages, referred to herein as a primary pilot flow passage 102 and a secondary pilot flow passage 104. Referring to FIG. 4, the fuel from the primary pilot flow passage 102 exits the fuel nozzle through a primary pilot fuel injector 163 and the fuel from the secondary pilot flow passage 104 exits the fuel nozzle through a secondary pilot fuel injector 167. The primary pilot flow passage 102 in the distributor ring 171 is in flow communication with a corresponding pilot primary passage in the supply conduit 80 contained within the stem 83 (see FIG. 3). Similarly, the secondary pilot flow passage 104 in the distributor ring 171 is in flow communication with a corresponding pilot secondary passage in the supply conduit 80 contained within the stem 83.

As described previously, fuel nozzles, such as those used in gas turbine engines, are subject to high temperatures. Such exposure to high temperatures may, in some cases, result in fuel coking and blockage in the fuel passages, such as for example, the exit passage 164. One way to mitigate the fuel coking and/or blockage in the distributor ring 171 is by using heat shields to protect the passages such as items 102, 104, 105, shown in FIG. 4, from the adverse thermal environment. In the exemplary embodiment shown in FIG. 3, the fuel conduits 102, 104, 105 are protected by gaps 116 and heat shields that at least partially surround these conduits. The gap 116 provides protection to the fuel passages by providing insulation from adverse thermal environment. In the exemplary embodiment shown, the insulation gaps 116 have widths between about 0.015 inches and 0.025 inches. The heat shields, such as those described herein, can be made from any suitable material with ability to withstand high temperature, such as, for example, cobalt based alloys and nickel based alloys commonly used in gas turbine engines. In exemplary embodiment shown in FIG. 4, the distributor ring 171 has a unitary construction wherein the distributor ring 171, the flow passages 102, 104, 105, the fuel outlets 165, the heat shields and the gaps 116 are formed such that they have a monolithic construction made using a DMLS process such as described herein.

FIG. 4 shows a unitary swirler 200 assembled inside an exemplary fuel nozzle assembly 100 according to an exemplary embodiment of the present invention. The exemplary swirler 200 comprises a body 201 having a hub 205 that extends circumferentially around a swirler axis 11 (alternatively referred to as a nozzle tip axis 11). A row of vanes 208 extending from the hub 205 are arranged in a circumferential direction on the hub 205, around the swirler axis 11. Each vane 208 has a root portion 210 located radially near the hub 205 and a tip portion 220 that is located radially outward from the hub 205. Each vane 208 has a leading edge 212 and a trailing edge 214 that extend between the root portion 210 and the tip portion 220. The vanes 208 have a suitable shape, such as, for example, an airfoil shape, between the leading edge 212 and the trailing edge 214. Adjacent vanes form a flow passage for passing air, such as the CDP air shown as item 190 in FIG. 4, that enters the swirler 200. The vanes 208 can be inclined both radially and axially relative to the swirler axis 11 to impart a rotational component of motion to the incoming air 190 that enters the swirler 200. These inclined swirler vanes 208 cause the air 190 to swirl in a generally helical manner within the fuel nozzle tip assembly 68. In one aspect of the swirler 200, the vane 208 has a fillet that extends between the root portion 210 and the hub 205 to facilitate a smooth flow of air in the swirler hub region. In the exemplary embodiment shown in FIGS. 4 and 18 herein, the vanes 208 have a cantilever-type of support, wherein it is structurally supported at its root portion 210 on the hub 205 with the vane tip portion 220 essentially free. It is also possible, in some alternative swirler designs, to provide additional structural support to at least some of the vanes 208 at their tip regions 210. In another aspect of the swirler 200, a recess 222 is provided on the tip portion 220 of a vane 228. During assembly of the fuel nozzle 100, the recess 222 engages with adjacent components in a fuel nozzle 100 to orient them axially, such as for example, shown in FIGS. 4 and 18.

Figure 13:
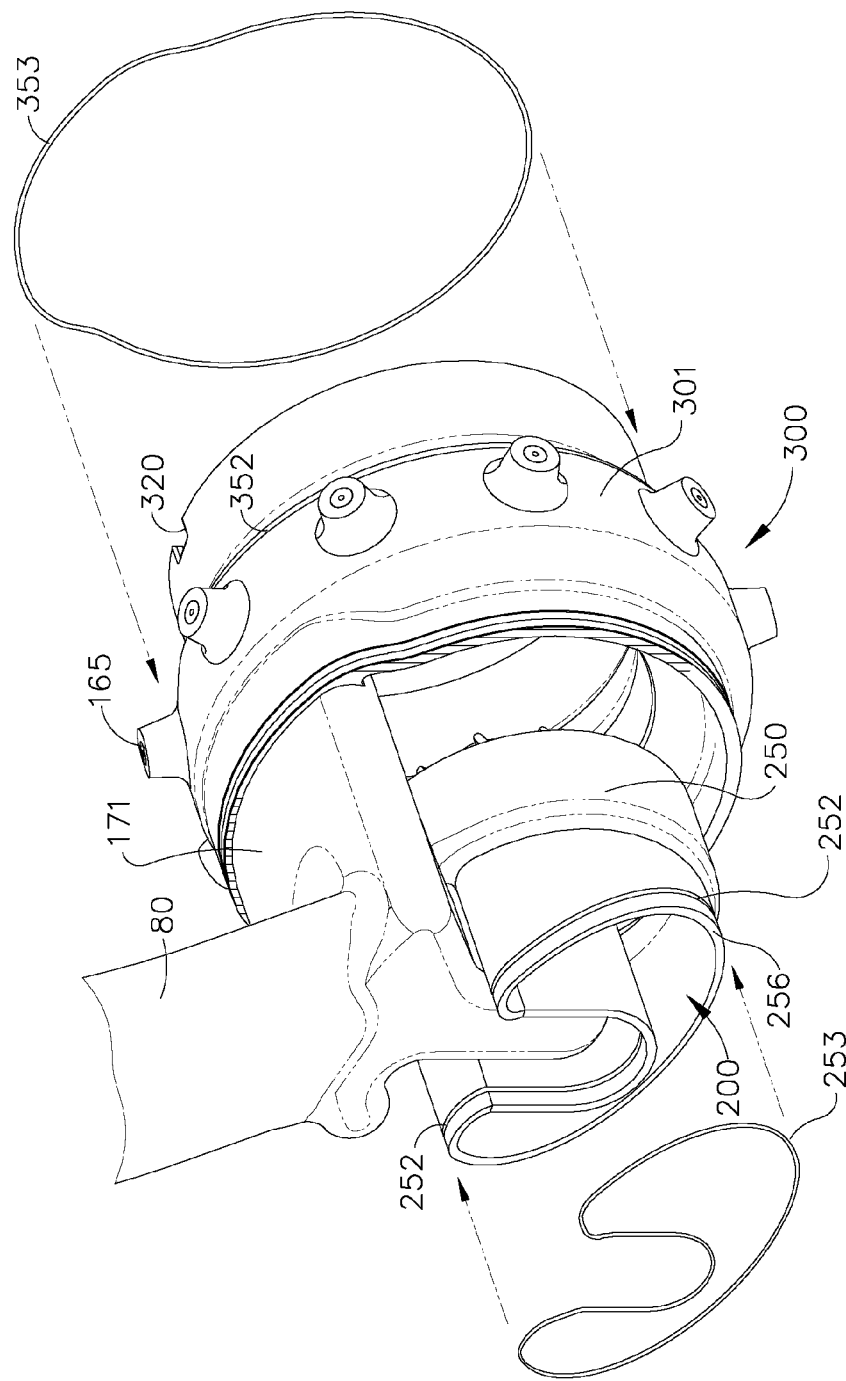
FIG. 13 is an isometric view of the exemplary fuel nozzle sub-assembly shown in FIG. 12.
Figure 18:
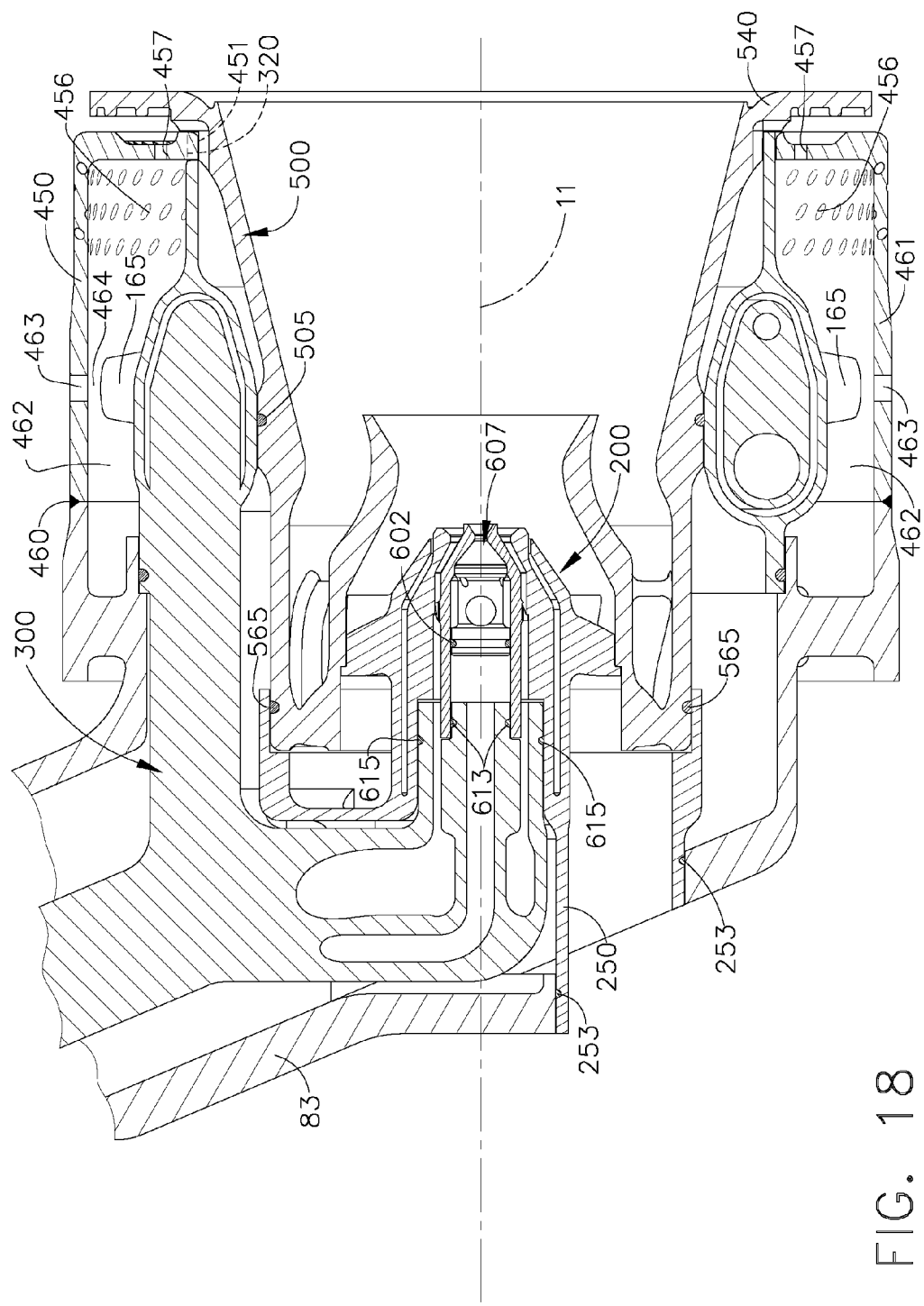
FIG. 18 is an axial cross-sectional view of the tip assembly area of the exemplary fuel nozzle shown in FIG. 2 after assembly.

The exemplary swirler 200 shown in FIGS. 4 and 18 comprises an adaptor 250 that is located axially aft from the circumferential row of vanes 208. The adaptor 250 comprises an arcuate wall 256 (see FIG. 4) that forms a flow passage 254 for channeling an air flow 190, such as for example, the CDP air flow coming out from a compressor discharge in a turbo fan engine 10 (see FIG. 1). The in-coming air 190 enters the passage 254 in the adaptor 250 and flows axially forward towards the row of vanes 208 of the swirler 200. In one aspect of the present invention, a portion 203 of the swirler body 201 extends axially aft from the hub 205 and forms a portion of the adaptor 250. In the exemplary embodiment shown in FIG. 6, the portion 203 of the body 201 extending axially aft forms a portion of the arcuate wall 256 of the adaptor 250. The adaptor 250 also serves as a means for mounting the swirler 200 in an assembly, such as a fuel nozzle tip assembly 68, as shown in FIG. 4. In the exemplary embodiment shown in FIG. 4, the adaptor 250 comprises an arcuate groove 252 for receiving a brazing material 253 (see FIG. 13) that is used for attaching the adaptor 250 to another structure, such as, for example, a fuel nozzle stem 83 shown in FIG. 2. As can be seen clearly in FIGS. 4 and 13, the groove 252 in the arcuate wall 256 has a complex three-dimensional geometry that is difficult to form using conventional machining methods. In one aspect of the present invention, the groove 252 in the arcuate wall 256 having a complex three-dimensional geometry, such as shown in the FIGS. 4 and 13, is formed integrally to have a unitary construction, using the methods of manufacturing described subsequently herein.

Figure 11:
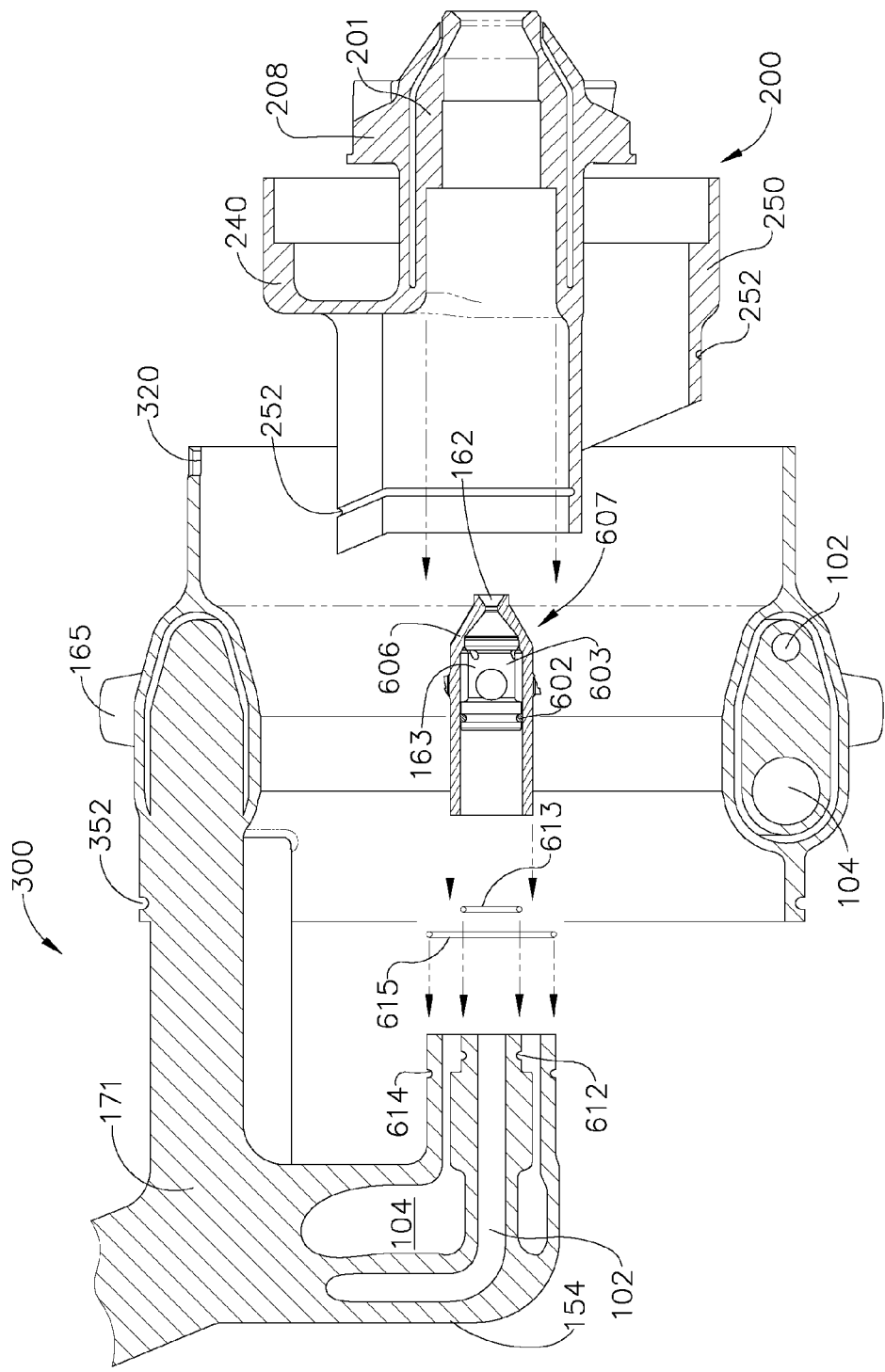
FIG. 11 is a schematic view of assembling braze wires in a distributor, primary pilot assembly and swirler.

The exemplary swirler 200 shown in FIGS. 4, 11 and 18 comprises an annular rim 240 that is coaxial with the swirler axis 11 and is located radially outward from the hub 205. As seen in FIGS. 4, 11 and 18, the rim 240 engages with adjacent components in the fuel nozzle 100, and forms a portion of the flow passage for flowing air 190 in the swirler 200. Airflow 190 enters the aft portion of the swirler 200 in an axially forward direction and is channeled toward the vanes 208 by the hub 205 and rim 240. In the exemplary embodiment shown in FIG. 4, airflow 190, such as from a compressor discharge, enters the passage 254 in the adaptor 250. As seen best in FIGS. 4 and 11, the axially forward end of the arcuate wall 256 of the adaptor 250 is integrally attached to the rim 240 and the body 201. In a preferred embodiment, the adaptor 250, rim 240, the body 201, the hub 205 and the vanes 208 have a unitary construction using the methods of manufacture described herein. Alternatively, the adaptor 250 may be manufactured separately and attached to the rim 240 and body 201 using conventional attachment means.

Referring to FIG. 4, a wall 260 extends between a portion of the rim 240 and a portion of the hub 205 the body 201. The wall 260 provides at least a portion of the structural support between the rim 240 and the hub 205 of the swirler. The wall 260 also ensures that air 190 coming from the adaptor 250 passage 254 into the forward portion of the swirler does not flow in the axially reverse direction and keeps the flow 190 going axially forward toward the vanes 208. In the exemplary embodiment shown in FIGS. 4 and 12, the forward face 262 of the wall 260 is substantially flat with respect to a plane perpendicular to the swirler axis 11. In order to promote a smooth flow of the air, the edges of the wall 260 are shaped smoothly to avoid abrupt flow separation at sharp edges.

It is common in combustor and fuel nozzle applications that the compressor discharge air 190 (see FIGS. 3 and 4) coming into the combustor and fuel nozzle regions is very hot, having temperatures above 800 Deg. F. Such high temperature may cause coking or other thermally induced distress for some of the internal components of fuel nozzles 100 such as, for example, the fuel flow passages 102, 104, swirler 200 and venturi 500. The high temperatures of the air 190 may also weaken the internal braze joints, such as, for example, between the fuel injector 163 and the distributor ring body 171 (see FIG. 4). In one aspect of the present invention, insulation gaps 216 are provided within the body 201 of the swirler 200 to reduce the transfer of heat from the air flowing in the fuel nozzle 100 and its internal components, such as primary fuel injectors 163 or secondary fuel injectors 167. The insulation gaps, such as items 116 and 216 in FIG. 4, help to reduce the temperature at the braze joints in a fuel nozzle assembly during engine operations. The insulation gap 216 may be annular, as shown in FIG. 4. Other suitable configurations based on known heat transfer analysis may also be used. In the exemplary embodiment shown in FIG. 4, the insulation gap is annular extending at least partially within the swirler body 201, and has a gap radial width of between about 0.015 inches and 0.025 inches. In one aspect of the present invention, the insulation gap 216 may be formed integrally with the swirler body 201 to have a unitary construction, using the methods of manufacturing described subsequently herein. The integrally formed braze groves, such as those described herein, may have complex contours and enable pre-formed braze rings such as items 253, 353 shown in FIG. 13 to be installed to promote easy assembly.

Referring to FIG. 4, it is apparent to those skilled in the art that the airflow 190 entering from the adaptor passage 254 is not uniform in the circumferential direction when it enters the vanes 208. This non-uniformity is further enhanced by the presence of the wall 260. In conventional swirlers, such non-uniformity of the flow may cause non-uniformities in the mixing of fuel and air and lead to non-uniform combustion temperatures. In one aspect of the present invention of a fuel nozzle 100, the adverse effects of circumferentially non-uniform flow entry can be minimized by having swirler vanes 208 with geometries that are different from those of circumferentially adjacent vanes. Customized swirler vane 208 geometries can be selected for each circumferential location on the hub 205 based on known fluid flow analytical techniques. A swirler having different geometries for the vanes 208 located at different circumferential locations can have a unitary construction and made using the methods of manufacture described herein.

FIG. 4 shows an axial cross-sectional view of an exemplary venturi 500 according to an exemplary embodiment of the present invention. The exemplary venturi 500 comprises an annular venturi wall 502 around the swirler axis 11 that forms a mixing cavity 550 wherein a portion of air and fuel are mixed. The annular venturi wall may have any suitable shape in the axial and circumferential directions. A conical shape, such as shown for example in FIG. 4, that allows for an expansion of the air/fuel mixture in the axially forward direction is preferred. The exemplary venturi 500 shown in FIGS. 4 and 16 has an axially forward portion 509 having an axially forward end 501, and an axially aft portion 511 having an axially aft end 519. The axially forward portion 509 has a generally cylindrical exterior shape wherein the annular venturi wall 502 is generally cylindrical around the swirler axis 11. The venturi wall 502 has at least one groove 504 located on its radially exterior side capable of receiving a brazing material during assembly of a nozzle tip assembly 68. In the exemplary embodiment shown in FIGS. 4 and 16, two annular grooves 504, 564 are shown, one groove 564 near the axially forward end 501 and another groove 504 near an intermediate location between the axially forward end 501 and the axially aft end 519. The grooves 504 may be formed using conventional machining methods. Alternatively, the grooves 504 may be formed integrally when the venturi wall 502 is formed, such as, for example, using the methods of manufacturing a unitary venturi 500 as described subsequently herein.

In another aspect of the present invention, the venturi 500 comprises a lip 518 (alternatively referred to herein as a drip-lip 518) located at the axially aft end 519 of the venturi wall 502. The drip-lip 518 has a geometry (see FIG. 16) such that liquid fuel particles that flow along the inner surface 503 of the venturi wall 502 separate from the wall 502 and continue to flow axially aft. The drip-lip 518 thus serves to prevent the fuel from flowing radially outwards along the venturi walls at exit.

Figure 16:
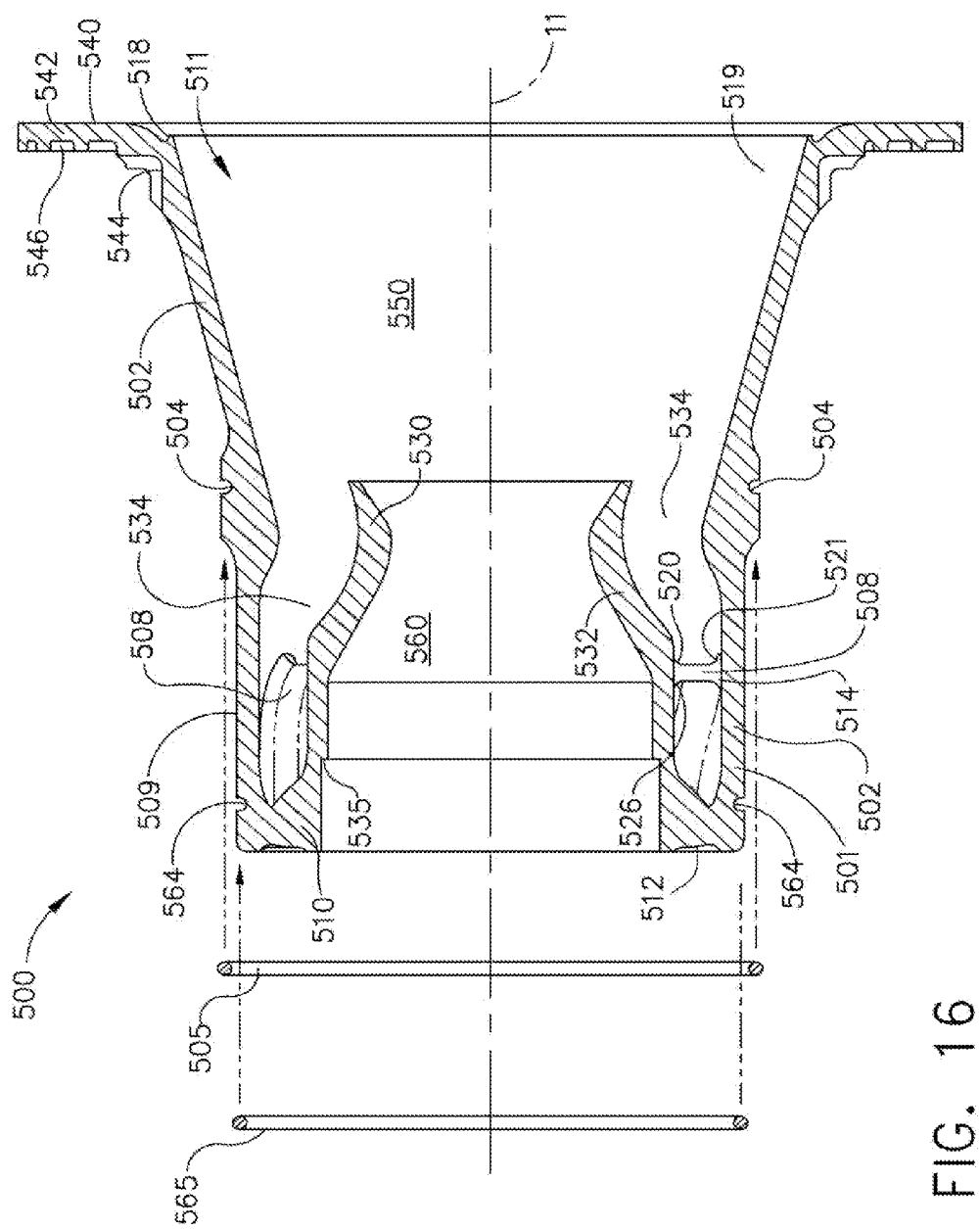
FIG. 16 is an axial cross sectional view of an exemplary venturi.

As shown in FIGS. 4 and 16, the exemplary embodiment of venturi 500 comprises an annular splitter 530 having an annular splitter wall 532 located radially inward from the annular venturi wall 502 and coaxially located with it around the swirler axis 11. The radially outer surface 533 of the splitter 530 and the radially inner surface 503 of the venturi wall 502 form an annular swirled-air passage 534. The forward portion of the splitter wall 532 has a recess 535 (see FIG. 16) that facilitates interfacing the venturi 500 with an adjacent component, such as for example, shown as item 208 in FIG. 4, during assembly of a fuel nozzle tip assembly 68. The splitter 530 has a splitter cavity 560 (see FIG. 16) wherein a portion of the air 190 mixes with the fuel ejected from the pilot outlets 162, 164 (see FIG. 4).

Figure 5:
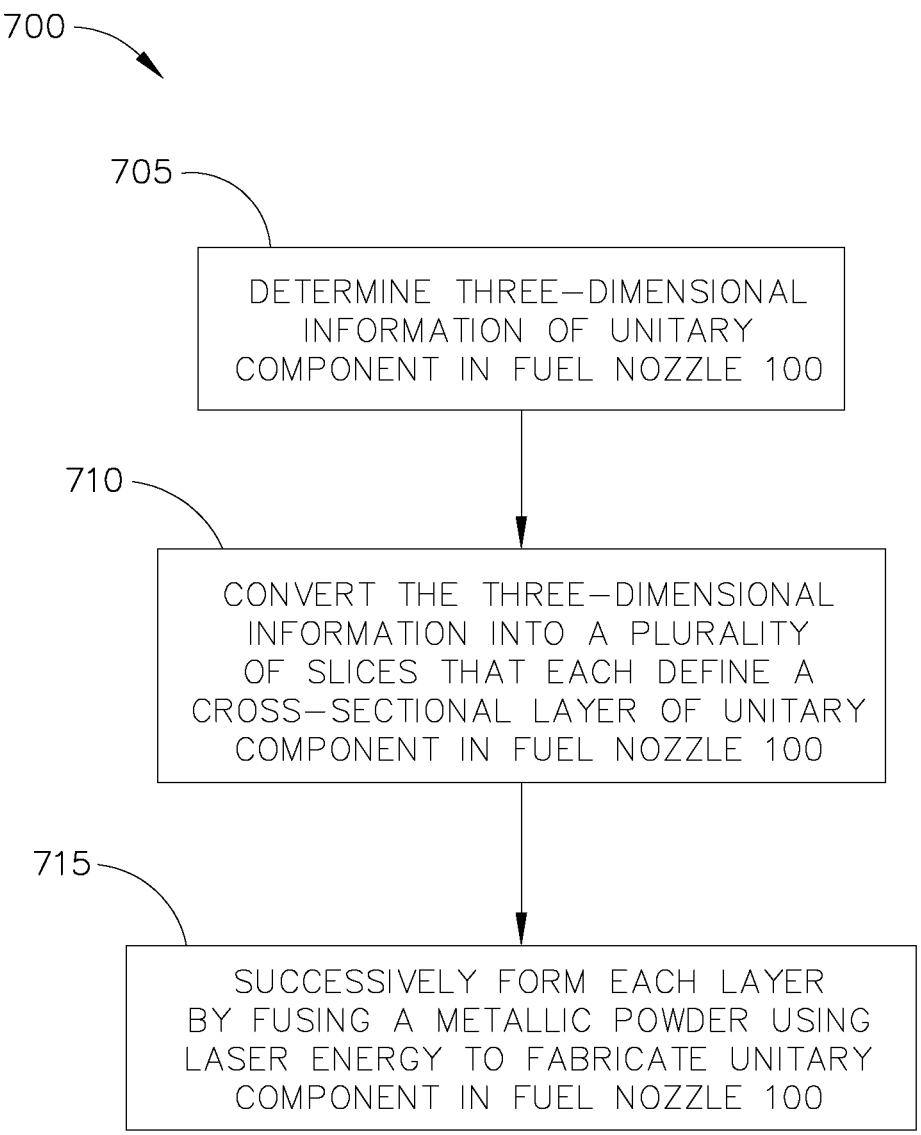
FIG. 5 is a flow chart showing an exemplary embodiment of a method for fabricating a unitary component according to an aspect of the present invention.

The exemplary embodiment of the venturi 500 shown in FIGS. 4 and 16 comprises a swirler 510. Although the swirler 510 is shown in FIG. 5 as being located at the axially forward portion 509 of the venturi 500, in other alternative embodiments of the present invention, it may be located at other axial locations within the venturi 500. The swirler 510 comprises a plurality of vanes 508 that extend radially inward between the venturi wall 502 and the annular splitter 530. The plurality of vanes 508 are arranged in the circumferential direction around the swirler axis 11.

Referring to FIGS. 4 and 16, in the exemplary embodiment of the swirler 510 shown therein, each vane 508 has a root portion 520 located radially near the splitter 530 and a tip portion 521 that is located radially near the venturi wall 502. Each vane 508 has a leading edge 512 and a trailing edge 514 that extend between the root portion 520 and the tip portion 521. The vanes 508 have a suitable shape, such as, for example, an airfoil shape, between the leading edge 512 and the trailing edge 514. Circumferentially adjacent vanes 508 form a flow passage for passing air, such as the CDP air shown as item 190 in FIG. 4, that enters the swirler 510. The vanes 508 can be inclined both radially and axially relative to the swirler axis 11 to impart a rotational component of motion to the incoming air 190 that enters the swirler 510. These inclined vanes 508 cause the air 190 to swirl in a generally helical manner within venturi 500. In one aspect of the present invention, the vane 508 has a fillet 526 that extends between the root portion 520 of the vane 508 and the splitter wall 532. The fillet 526 facilitates a smooth flow of air within the swirler and in the swirled air passage 534. The fillet 526 has a smooth contour shape that is designed to promote the smooth flow of air in the swirler. The contour shapes and orientations for a particular vane 508 are designed using known methods of fluid flow analysis. Fillets similar to fillets 526 having suitable fillet contours may also be used between the tip portion 521 of the vane 508 and the venturi wall 502. In the exemplary embodiment of the venturi 500 shown in FIGS. 4 and 16 herein, the vanes 508 are supported near both the root portion 520 and the tip portion 521. It is also possible, in some alternative venturi designs, to have a swirler comprising vanes having a cantilever-type of support, wherein a vane is structurally supported at only one end, with the other end essentially free. The venturi 500 may be manufactured from known materials that can operate in high temperature environments, such as, for example, nickel or cobalt based super alloys, such as CoCr, HS188, N2 and N5.

The venturi 500 comprises a heat shield 540 for protecting venturi and other components in the fuel nozzle tip assembly 68 (see FIG. 3) from the flames and heat from ignition of the fuel/air mixture in a fuel nozzle 100. The exemplary heat shield 540 shown in FIGS. 4 and 16 has an annular shape around the swirler axis 11 and is located axially aft from the swirler 510, near the axially aft end 519 of the venturi 500. The heat shield 540 has an annular wall 542 that extends in a radially outward direction from the swirler axis 11. The annular wall 542 protects venturi 500 and other components in the fuel nozzle 100 from the flames and heat from ignition of the fuel/air mixture, having temperatures in the range of 2500 Deg. F. to 4000 Deg. F. The heat shield 540 is made from a suitable material that can withstand high temperatures. Materials such as, for example, CoCr, HS188, N2 and N5 may be used. In the exemplary embodiments shown herein, the heat shield 540 is made from CoCr material, and has a thickness between 0.030 inches and 0.060 inches. It is possible, in other embodiments of the present invention, that the heat shield 540 may be manufactured from a material that is different from the other portions the venturi, such as the venturi wall 502 or the swirler 510.

The exemplary venturi 500 shown in FIGS. 4 and 16 has certain design features that enhance the cooling of the heat shield 540 to reduce its operating temperatures. The exemplary venturi 500 comprises at least one slot 544 extending between the venturi wall 502 and the heat shield 540. The preferred exemplary embodiment of the venturi 500, shown in FIGS. 4 and 16, comprises a plurality of slots 544 extending between the venturi wall 502 and the heat shield 540 wherein the slots 544 are arranged circumferentially around the swirler axis 11. The slots 544 provide an exit passage for cooling air that flows through the cavity between the fuel conduit and the venturi wall 502 (See FIG. 4). The cooling air entering the axially oriented portion of each slot 544 is redirected in the radially oriented portion of the slot 544 to exit from the slots 544 in a generally radial direction onto the side of the annular wall 542 of the heat shield. In another aspect of the present invention, the exemplary venturi 500 comprises a plurality of bumps 546 located on the heat shield 540 and arranged circumferentially on the axially forward side of the heat shield wall 542 around the swirler axis 11. These bumps 546 provide additional heat transfer area and increase the heat transfer from the heat shield 540 to the cooling air directed towards, thereby reducing the operating temperatures of the heat shield 540. In the exemplary embodiment shown in FIG. 4, the bumps 546 are arranged in four circumferential rows, with each row having between 100 and 120 bumps.

Referring to FIGS. 4 and 16, it is apparent to those skilled in the art that a portion of the airflow 190 entering the swirler 510 of the venturi 500, in some cases, may not be uniform in the circumferential direction when it enters passages between the vanes 508. This non-uniformity is further enhanced by the presence of other features, such as, for example, the wall 260 (see FIG. 4). In conventional venturis, such non-uniformity of the flow may cause non-uniformities in the mixing of fuel and air in the venturi and lead to non-uniform combustion temperatures. In one aspect of the present invention, the adverse effects of circumferentially non-uniform flow entry can be minimized by having a swirler 510 comprising some swirler vanes 508 with geometries that are different from those of circumferentially adjacent vanes. Customized swirler vane 508 geometries can be selected for each circumferential location based on known fluid flow analytical techniques. A venturi 500 having swirlers with different geometries for the vanes 508 located at different circumferential locations can have a unitary construction and made using the methods of manufacture described herein.

In the exemplary embodiment of a fuel nozzle 100 shown in FIGS. 1-4 and FIG. 18, the fuel nozzle 100 comprises an annular centerbody 450. The centerbody 450 comprises an annular outer wall 461 that, in the assembled condition of the fuel nozzle 100 as shown in FIGS. 2, 3, 4 and 18, surround the forward portion of the distributor 300 and forms an annular passage 462 for air flow. A feed air stream for cooling the fuel nozzle 100 enters the air flow passage 412 between the centerbody outer wall 461 and the distributor 300 and flows past the fuel posts 165, facilitating the cooling of the distributor 300, centerbody 450 and fuel orifices and fuel posts 165. The outer wall 461 has a plurality of openings 463 that are arranged in the circumferential direction, corresponding to the orifices in the circumferential row of fuel posts 165. Fuel ejected from the fuel posts 165 exits from the fuel nozzle 100 through the openings 463. In the exemplary fuel nozzle 100, scarfs 452, 454 are provided near openings 463 at the main fuel injection sites on the outer side of the centerbody 450 wall 461, as shown in FIG. 2, for fuel purge augmentation. The scarfs are upstream (454) or downstream (452) so that the main circuit will actively purge during the modes when the main fuel flow is shut off. In some embodiments, such as shown in FIGS. 4 and 18, it is possible to have a small gap 464 between the inner diameter of the outer wall 461 and the outer end of the fuel posts 165. In the exemplary embodiment shown in FIGS. 4 and 18, this gap ranges between about 0.000 inches to about 0.010 inches.

Figure 8:
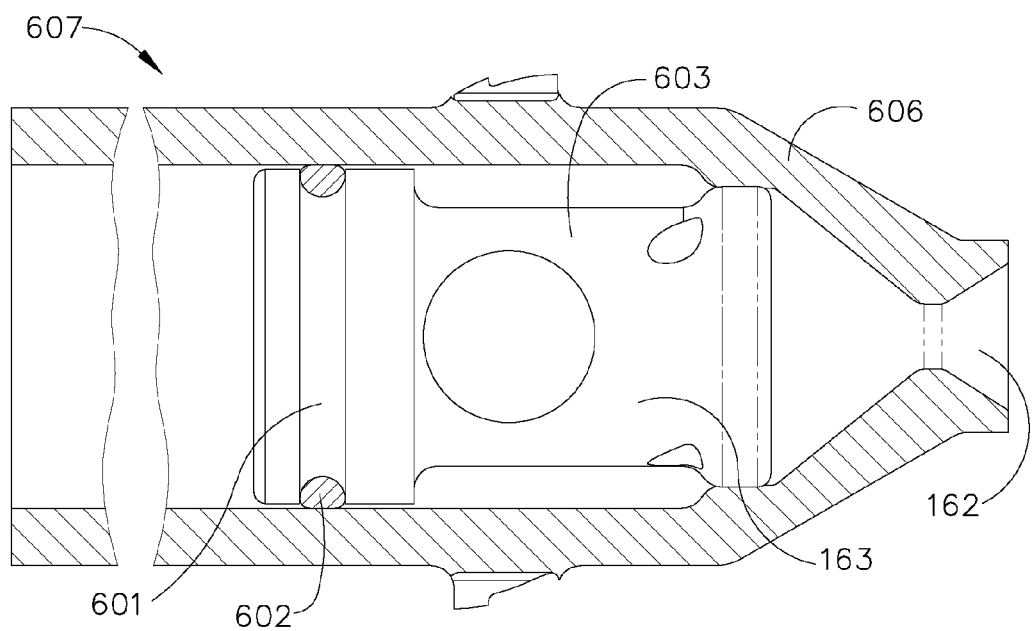
FIG. 8 is an axial cross-sectional view of an exemplary primary pilot assembly.

In the exemplary embodiment shown in FIGS. 4 and 18, the centerbody wall 461 is cooled by a multi-hole cooling system which passes a portion of the feed air stream entering the fuel nozzle 100 through one or more circumferential rows of openings 456. The multi-hole cooling system of the centerbody may typically use one to four rows of openings 456. The openings 456 may have a substantially constant diameter. Alternatively, the openings 456 may be diffuser openings that have a variable cross sectional area. In the exemplary embodiments shown in FIGS. 2, 4 and 18, the centerbody 450 has three circumferential rows of openings 456, each row having between 60 to 80 openings and each opening having a diameter varying between about 0.020 inches and 0.030 inches. As shown in FIGS. 2, 4, and 8, the openings 456 can have a complex orientation in the axial, radial and tangential directions within the centerbody outer wall 461. Additional rows of cooling holes 457 arranged in the circumferential direction in the centerbody wall 461 are provided to direct the cooling air stream toward other parts of the fuel nozzle 100, such as the venturi 500 heat shield 540. In the exemplary embodiment shown in FIGS. 2, 4 and 18, the fuel nozzle 100 comprises an annular heat shield 540 located at one end of the venturi 540. The heat shield 540 shields the fuel nozzle 100 components from the flame that is formed during combustion in the combustor. The heat shield 540 is cooled by one or more circumferential rows of holes 457 having an axial orientation as shown in FIGS. 4 and 18 that direct cooling air to impinge on the heat shield 540. In the exemplary fuel nozzle 100 described herein, the holes 457 typically have a diameter of at least 0.020 inches arranged in a circumferential row having between 50 to 70 holes, with a hole size preferred between about 0.026 inches to about 0.030 inches. The centerbody 450 may be manufactured from known materials that can operate in high temperature environments, such as, for example, nickel or cobalt based super alloys, such as CoCr, HS188, N2 and N5. The cooling holes 456, 457 openings 463 and scarfs 452, 454 in the centerbody 450 may be made using known manufacturing methods. Alternatively, these features of the centerbody can be made integrally using the manufacturing methods for unitary components described herein, such as, preferably, the DMLS method shown in FIG. 5 and described herein. In another embodiment of the invention, a heat shield similar to item 540 shown in FIGS. 4 and 18 may be made integrally to have a unitary construction with centerbody 450 using the DMLS method. In another embodiment of the invention, the centerbody 450, the venturi 500 and a heat shield similar to item 540 shown in FIGS. 4 and 18 may be made integrally to have a unitary construction using the DMLS method.

The exemplary embodiment of the fuel nozzle 100 described herein comprises unitary components such as, for example, the unitary conduit 80/distributor 300, unitary swirler 200, unitary venturi 500 and unitary centerbody 450. Such unitary components used in the fuel nozzle 100 can be made using rapid manufacturing processes such as Direct Metal Laser Sintering (DMLS), Laser Net Shape Manufacturing (LNSM), electron beam sintering and other known processes in the manufacturing. DMLS is the preferred method of manufacturing the unitary components used in the fuel nozzle 100, such as, for example, the unitary conduit 80/distributor 300, unitary swirler 200, unitary venturi 500 and unitary centerbody 450 described herein.

FIG. 5 is a flow chart illustrating an exemplary embodiment of a method 700 for fabricating unitary components for fuel nozzle 100, such as, for example, shown as items 80, 200, 300, 450 and 500 in FIGS. 2-18 and described herein. Although the method of fabrication 700 is described below using unitary components 80, 200, 300, 450 and 500 as examples, the same methods, steps, procedures, etc. apply for alternative exemplary embodiments of these components. Method 700 includes fabricating a unitary component 80, 200, 300, 450, 500 using Direct Metal Laser Sintering (DMLS). DMLS is a known manufacturing process that fabricates metal components using three-dimensional information, for example a three-dimensional computer model, of the component. The three-dimensional information is converted into a plurality of slices, each slice defining a cross section of the component for a predetermined height of the slice. The component is then "built-up" slice by slice, or layer by layer, until finished. Each layer of the component is formed by fusing a metallic powder using a laser.

Accordingly, method 700 includes the step 705 of determining three-dimensional information of a specific unitary component 80, 200, 300, 450, 500 in the fuel nozzle 100 and the step 710 of converting the three-dimensional information into a plurality of slices that each define a cross-sectional layer of the unitary component. The unitary component 80, 200, 300, 450, 500 is then fabricated using DMLS, or more specifically each layer is successively formed in step 715 by fusing a metallic powder using laser energy. Each layer has a size between about 0.0005 inches and about 0.001 inches. Unitary components 80, 200, 300, 450, 500 may be fabricated using any suitable laser sintering machine. Examples of suitable laser sintering machines include, but are not limited to, an EOSINT® M 270 DMLS machine, a PHENIX PM250 machine, and/or an EOSINT® M 250 Xtended DMLS machine, available from EOS of North America, Inc. of Novi, Mich. The metallic powder used to fabricate unitary components 80, 200, 300, 450, 500 is preferably a powder including cobalt chromium, but may be any other suitable metallic powder, such as, but not limited to, HS188 and INCO625. The metallic powder can have a particle size of between about 10 microns and 74 microns, preferably between about 15 microns and about 30 microns.

Although the methods of manufacturing unitary components 80, 200, 300, 450, 500 in the fuel nozzle 100 have been described herein using DMLS as the preferred method, those skilled in the art of manufacturing will recognize that any other suitable rapid manufacturing methods using layer-by-layer construction or additive fabrication can also be used. These alternative rapid manufacturing methods include, but not limited to, Selective Laser Sintering (SLS), 3D printing, such as by inkjets and laserjets, Sterolithography (SLS), Direct Selective Laser Sintering (DSLS), Electron Beam Sintering (EBS), Electron Beam Melting (EBM), Laser Engineered Net Shaping (LENS), Laser Net Shape Manufacturing (LNSM) and Direct Metal Deposition (DMD).

Another aspect of the present invention comprises a simple method of assembly of the fuel nozzle 100 having unitary components having complex geometrical features as described earlier herein. The use of unitary components in the fuel nozzle 100 as described herein has enabled the assembly of fuel nozzle 100 having fewer number of components and with fewer number of joints than conventional nozzles. For example, in the exemplary embodiment of the fuel nozzle 100 shown herein, the fuel nozzle tip 68 comprises only seven braze joints and one weld joint, whereas some known conventional nozzles have twenty two braze joints and three weld joints.

Figure 6:
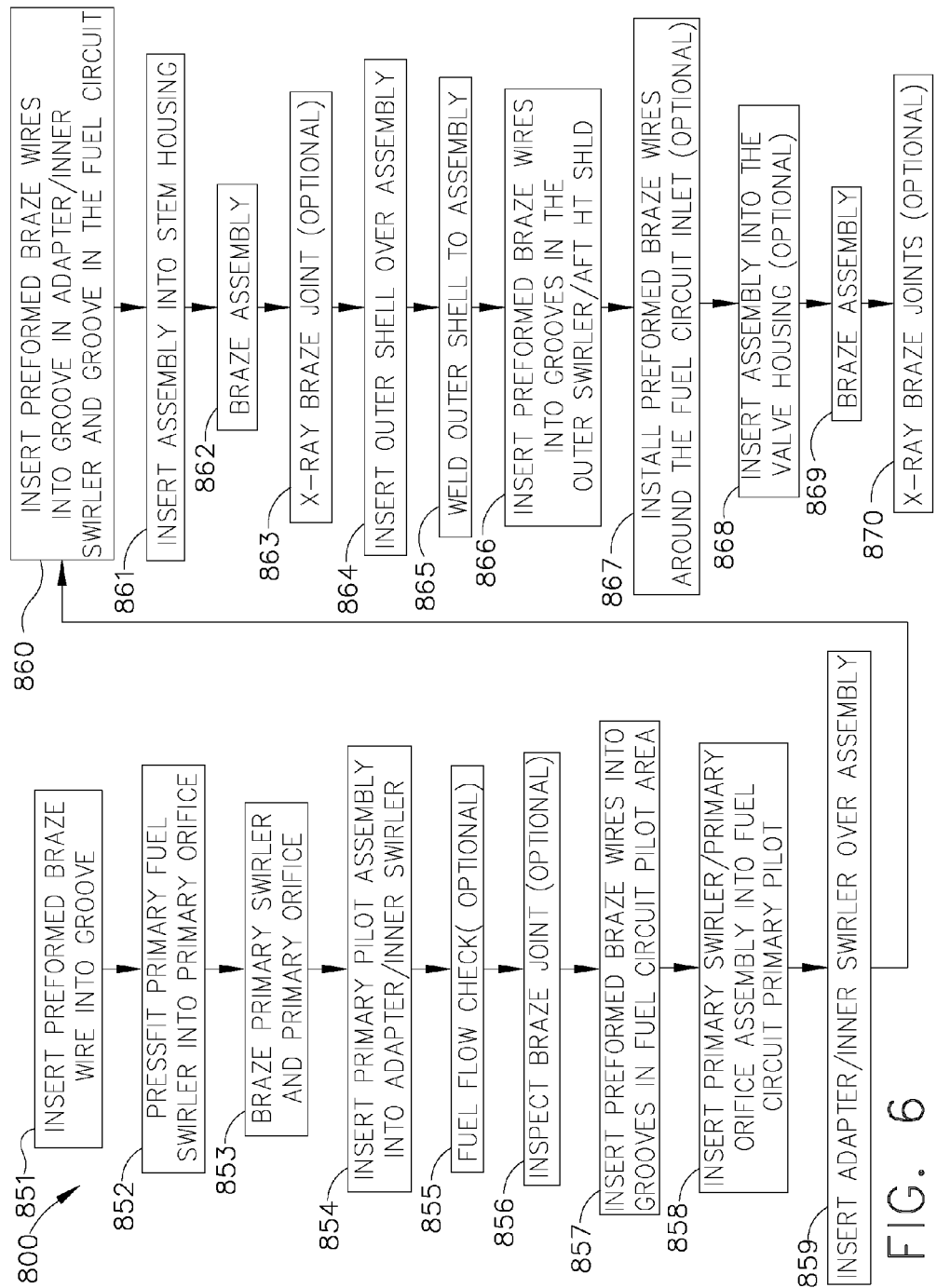
FIG. 6. is a flow chart showing an exemplary embodiment of an aspect of the present invention of a method of assembling a fuel nozzle.

An exemplary method of assembly 800 according to the present invention is shown in FIG. 6 and Steps are described in detail below. The exemplary method of assembly 800 shown FIG. 6 can be used to assemble the exemplary fuel nozzle 100 described previously herein. In the exemplary method of assembly 800 shown in FIG. 6, the assembly process uses fewer number of components and joints, and is simpler than conventional methods.

Figure 7:
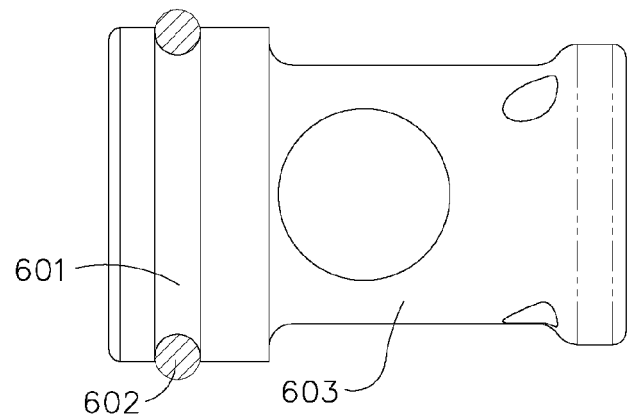
FIG. 7 is a top plan view of an exemplary fuel swirler having a braze wire with a portion sectioned away.

Referring to FIG. 6 for the various steps described below to assemble the exemplary fuel nozzle 100, in Step 851, a preformed braze wire 602 is inserted into a braze groove 601 in Primary Fuel Swirler 603 as shown in FIG. 7. The braze wire material can be a known braze material, such as AMS4786 (gold nickel alloy). In FIG. 7 the exemplary braze wire 602 has a circular cross section. Other suitable cross sectional shapes for the braze wire 602 and corresponding shapes for the braze grove 601 can be used.

In Step 852 the Primary Fuel Swirler 603 is press-fit into the Primary Orifice 606 as shown in FIG. 8.

In Step 853, the Primary Fuel Swirler 603 and Primary Orifice 606 are brazed together to form a Primary Pilot Assembly 607 as shown in FIG. 8. Brazing is performed using known methods. A brazing temperature of between 1840 Deg. F. and 1960 Deg. F. can be used. Brazing at a temperature of 1950 Deg. F. is preferred.

Figure 9:
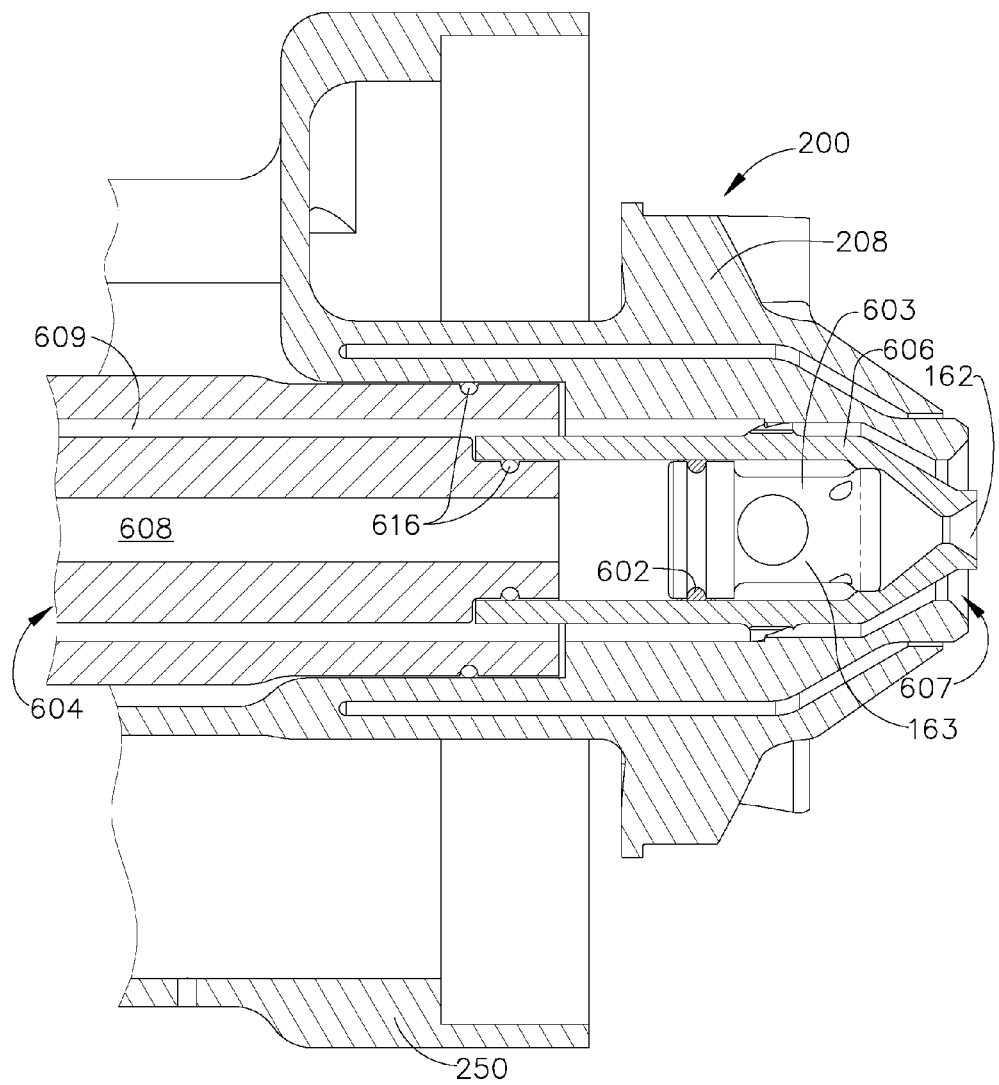
FIG. 9 is an axial cross-sectional view of an exemplary primary pilot assembly and an exemplary swirler placed on a test fixture.

In Step 854, the Primary Pilot Assembly 607 is inserted into the Adapter 250 and Inner Swirler 200 as shown in FIG. 9.

In the optional Step 855, fuel flow check is performed, to check the fuel flow patterns in the pilot fuel flow circuits. An exemplary arrangement is shown in FIG. 9, showing a primary pilot flow circuit 608 and a secondary pilot flow circuit 609. Suitable test fixtures known in the art, such as for example shown as item 604 in FIG. 9 may be used during the flow checking step 855. Known sealing methods, such as for example using O-rings 616 shown in FIG. 9, may be used for preventing fuel leakage during the optional flow checking step 855. After flow checking is completed, the primary pilot assembly 607 is removed from test fixture 604 and adapter 250 and inner swirler 200.

Figure 10:
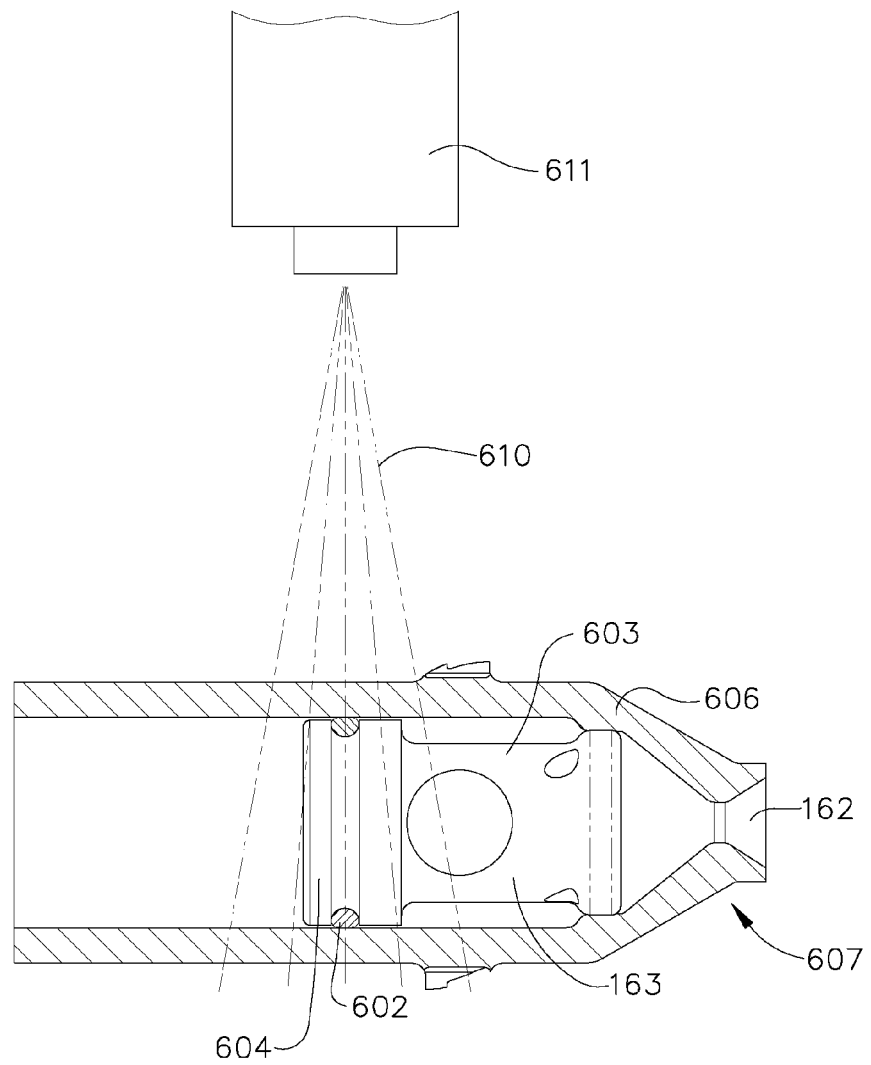
FIG. 10 is a schematic view of an X-ray inspection of a primary pilot assembly.

In the optional Step 856, a non-destructive inspection of the braze joint in the primary pilot assembly 607 is performed, as shown for example in FIG. 10. X-ray inspection using known techniques is preferred for inspecting the braze joint. X-rays 610 from a known X-ray source 611 can be used.

In Step 857, a preformed braze wire is inserted in a braze-groove in the distributor 300 fuel circuit pilot areas. FIG. 11 shows an exemplary braze groove 612 in the pilot supply tube 154 around the wall surrounding the primary pilot flow passage 102. The exemplary distributor 300 shown in FIG. 11 also comprises a secondary pilot flow passage 104, and a braze groove 614 that is formed around the wall surrounding the secondary pilot flow passage 104. As described previously herein, the braze grooves 612 and 614 may be formed in a unitary distributor 300 using the manufacturing techniques such as DMLS. Alternatively, these braze grooves may be formed using machining or other known techniques. The braze wires 613, 615 can be made from a known braze material, such as AMS4786 (gold nickel alloy). In FIG. 11, the exemplary braze wires 613 and 615 have circular cross-sections. Other suitable cross sectional shapes for the braze wires 613, 615 and corresponding shapes for the braze grove 612, 614 can alternatively be used. In the exemplary Step 857, the braze wire 613 is inserted into the braze groove 612 and the braze wire 615 is inserted into the braze groove 614 as shown in FIG. 11.

In Step 858, illustrated in FIG. 11, the Primary pilot assembly 607 is inserted on the primary fuel circuit portion of the primary pilot supply tube 154 of the distributor 300.

Figure 12:
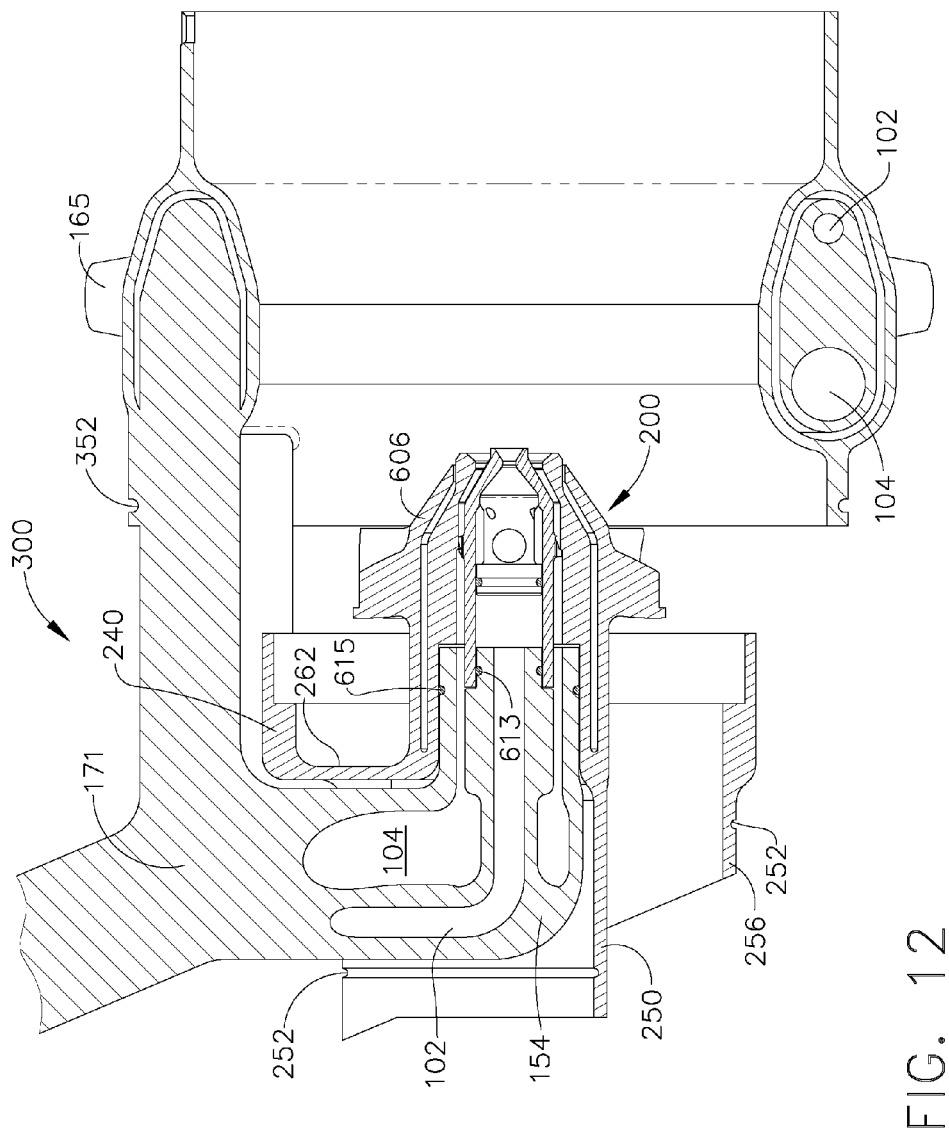
FIG. 12 is an axial cross sectional view of an exemplary fuel nozzle sub-assembly.

In Step 859, illustrated in FIGS. 11 and 12, the inner swirler/adaptor 200 is inserted over assembly from Step 858, such that the primary pilot assembly 607 and the braze wire 615 fit inside the inner swirler/adaptor 200. FIG. 12 shows the assembled condition after this step.

In Step 860, a preformed braze wire 253 is inserted into a groove 252 located in the wall 256 of the adapter/Inner Swirler 200 as shown in FIG. 13. A preformed braze wire 353 is inserted into a groove 352 located in distributor 300 wall as shown in FIG. 13. As described previously herein, the braze groove 252 in the adaptor may be formed in a unitary adaptor/swirler 200 and braze groove 352 may be formed in a unitary distributor 300 using the manufacturing techniques such as DMLS. Alternatively, these braze grooves may be formed using machining or other known techniques. The braze wires 253, 353 are made from known braze materials, such as AMS4786 (gold nickel alloy). In FIG. 13, the exemplary braze wires 253 and 353 have circular cross-sections. Other suitable cross-sectional shapes for the braze wires 253, 353 and corresponding shapes for the braze grove 252, 352 can alternatively be used.

Figure 14:
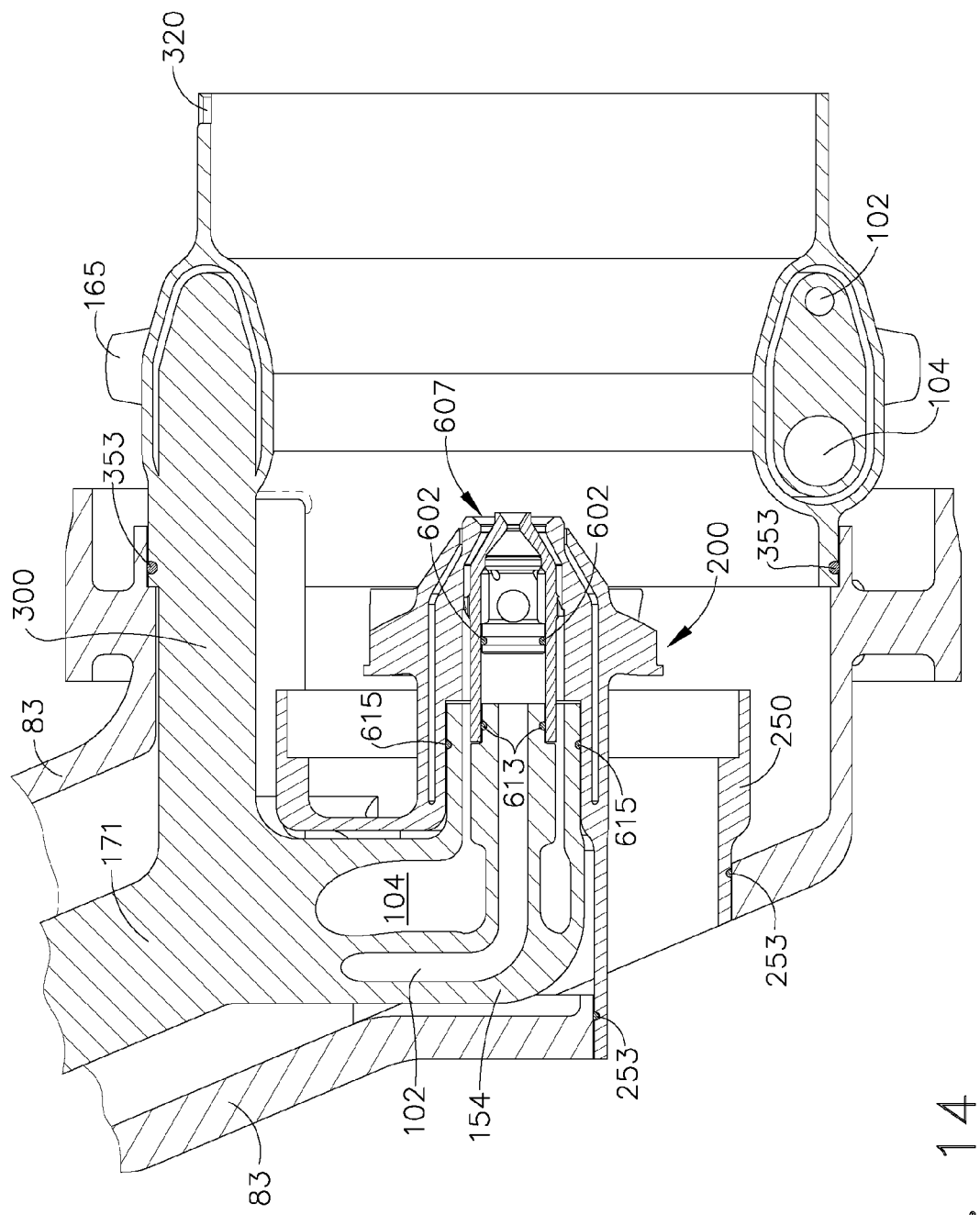
FIG. 14 is a partial axial cross sectional view of the sub-assembly shown in FIG. 12 inserted in a stem housing.

In Step 861, the assembly of the primary pilot assembly 607, adaptor/swirler 200 and distributor 300 having braze wires 613, 615, 253, 253 in their corresponding grooves as described above, is inserted into the stem 83 and positioned as shown in FIG. 14.

In Step 862, the assembly from Step 861 shown in FIG. 14 is brazed. Brazing is performed using known methods. A brazing temperature of between 1800 Deg. F. and 1860 Deg. F. can be used. Brazing at a temperature of 1850 Deg. F. is preferred.

In the optional Step 863, a non-destructive inspection of the braze joints formed in Step 862 (see FIG. 14) is performed. X-ray inspection using known techniques is preferred for inspecting the braze joint.

In Step 864, the centerbody 450 (alternatively referred to herein as outer shell) is inserted over the assembly from Step 862 after brazing. The centerbody 450 is located circumferentially with respect to the distributor 300 by aligning the tab 451 in the centerbody 450 with a notch 320 that is located at the aft edge of the distributor (see FIG. 13). Other known methods of circumferentially locating the outer shell may alternatively be used.

Figure 15:
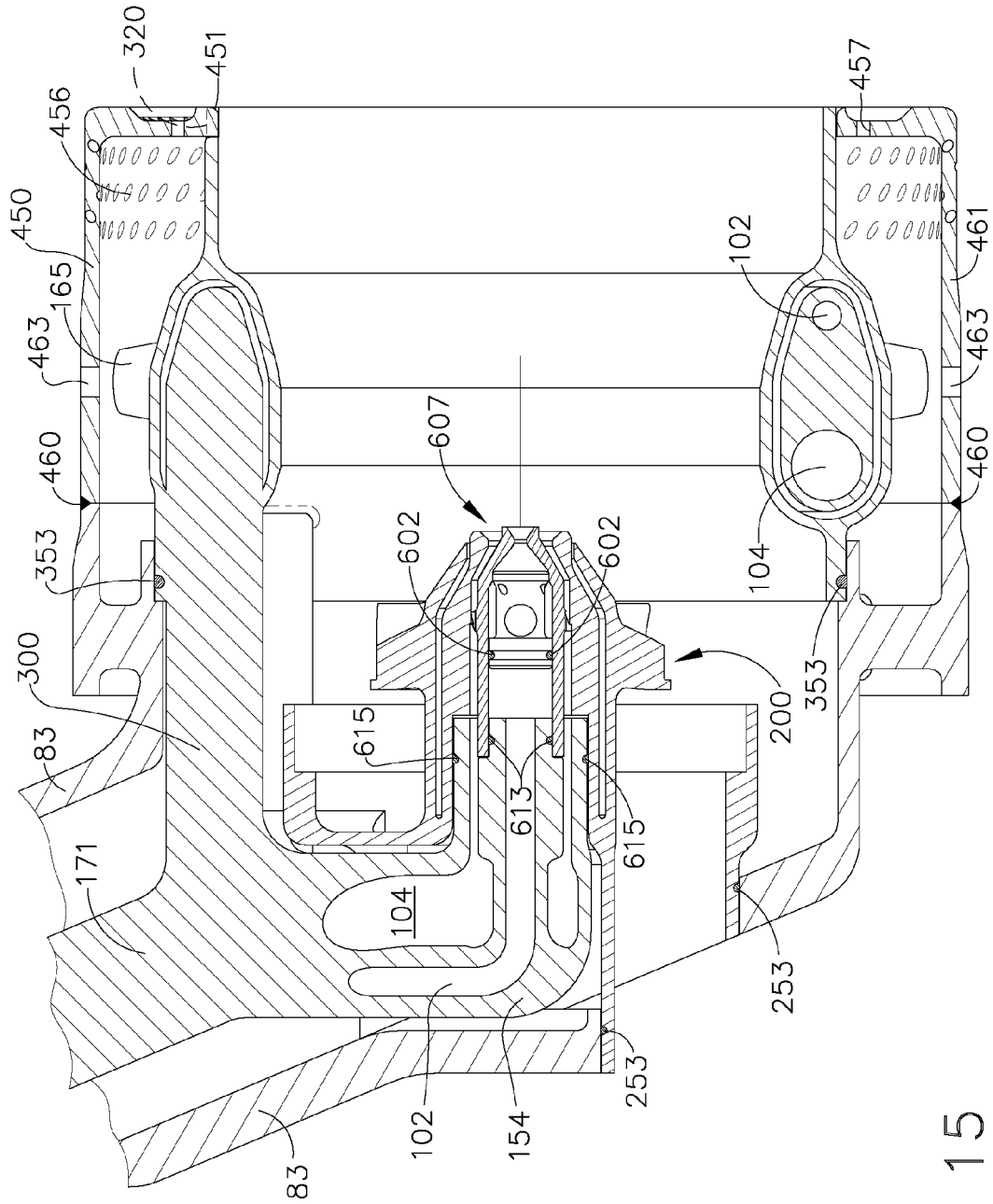
FIG. 15 is a partial axial cross sectional view of an outer shell assembled to the sub-assembly shown in FIG. 14.

In Step 865, the outer shell 450 is welded to assembly obtained from Step 864, shown in FIG. 15. Known welding methods can be used for this purpose. A preferred welding method is TIG welding, using HS188 weld wire. The resulting weld 460 between the outer shell 450 and the stem 83 is shown in FIG. 15.

In Step 866, referring to FIG. 16, preformed braze wire 505 is inserted to into a groove 504 and preformed braze wire 565 is inserted to into a groove 564 in the venturi 500. As described previously herein, the grooves 504, 564 in the venturi may be formed in a unitary venturi 500 using the manufacturing techniques such as DMLS. Alternatively, these braze grooves may be formed using machining or other known techniques. The braze wires 505, 565 are made from known braze materials, such as AMS4786 (gold nickel alloy). In FIG. 16, the exemplary braze wires 505 and 565 have circular cross-sections. Other suitable cross-sectional shapes for the braze wires 505, 565 and corresponding shapes for the braze groves 504, 564 can alternatively be used.

Figure 17:
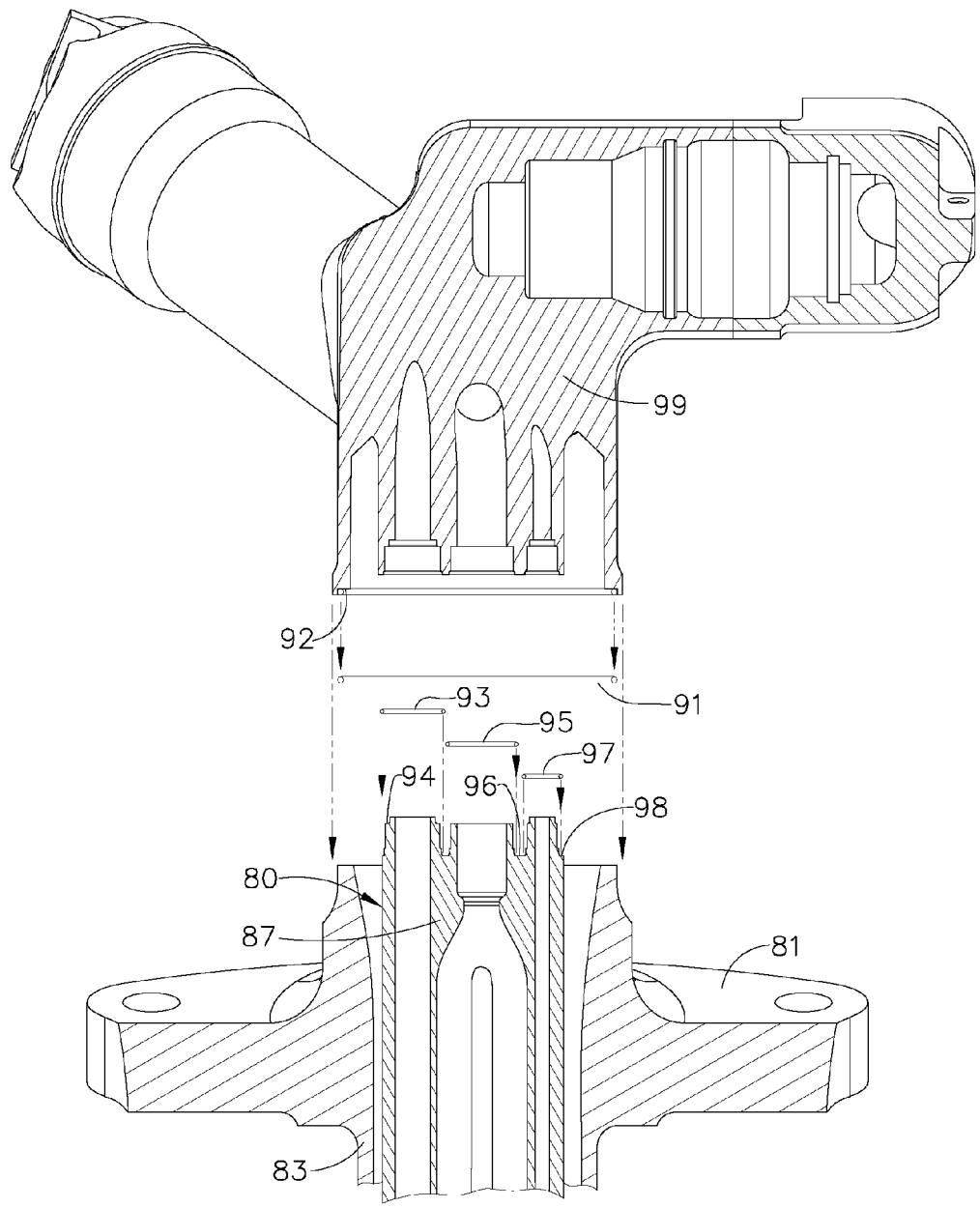
FIG. 17 is a partial cross-sectional view of an exemplary fuel nozzle stem housing and valve housing.

Referring to FIG. 17, in optional Step 867, preformed braze wires 91, 93, 95, 97 are inserted into the corresponding grooves 92, 94, 96, 98 around the fuel circuit inlets in the conduit 80 or valve housing 99. The braze wires 91, 93, 95, 97 are made from known braze materials, such as AMS4786 (gold nickel alloy). A circular cross sectional shape is preferred for the braze wires 91, 93, 95, 97. However, other suitable cross sectional shape may alternatively be used In optional Step 868, the assembly from step 867 is inserted into the valve housing 99, shown in FIG. 17.

In Step 869, the assembly shown in FIG. 18 is brazed. The assembly shown in FIG. 17, if selected in optional Step 868, is also brazed. Brazing is performed using known methods. A brazing temperature of between 1800 Deg. F. and 1860 Deg. F. can be used. Brazing at a temperature of 1850 Deg. F. is preferred.

In the optional Step 870, a non-destructive inspection of the braze joints formed in Step 869 (see FIGS. 17 and 18) is performed. X-ray inspection using known techniques is preferred for inspecting the braze joints.

The fuel nozzle 100 in a turbine engine (see FIGS. 1-4) and the method of assembly 800 (see FIG. 6) comprises fewer components and joints than known fuel nozzles. Specifically, the above described fuel nozzle 100 requires fewer components because of the use of one-piece, unitary components such as, for example, unitary conduit 80/distributor 300, unitary swirler 200 and unitary venturi 500. As a result, the described fuel nozzle 100 provides a lighter, less costly alternative to known fuel nozzles. Moreover, the described unitary construction for at least some of the fuel nozzle 100 components and method of assembly 800 provides fewer opportunities for leakage or failure and is more easily repairable compared to known fuel nozzles.

As used herein, an element or step recited in the singular and proceeded with the word "a" or "an" should be understood as not excluding plural said elements or steps, unless such exclusion is explicitly recited. When introducing elements/components/steps etc. of fuel nozzle 100 and its components described and/or illustrated herein, the articles "a", "an", "the" and "said" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc. Furthermore, references to "one embodiment" of the present invention are not intended to be interpreted as excluding the existence of additional embodiments that also incorporate the recited features.

Although the methods such as method of manufacture 700 and method of assembly 800, and articles such as unitary conduit 80/distributor 300, unitary swirler 200, unitary venturi 500 and unitary centerbody 450 described herein are described in the context of swirling of air for mixing liquid fuel with air in fuel nozzles in a turbine engine, it is understood that the unitary components and methods of their manufacture and their assembly described herein are not limited to fuel nozzles or turbine engines. The method of manufacture 700, method of assembly 800 and fuel nozzle 100 and its components illustrated in the figures included herein are not limited to the specific embodiments described herein, but rather, these can be utilized independently and separately from other components described herein.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fuel nozzle apparatus comprising:
    a fuel distributor comprising:
        a fuel conduit;
        an annular distributor ring including: an array of fuel outlets, a main fuel passage communicating with the fuel conduit and the fuel outlets, and an aft interior mounting surface; and
        a pilot supply tube extending axially from an inner end of the fuel conduit, and including a pilot fuel passage;
    a venturi, comprising:
        an annular splitter including a cylindrical forward portion with a first bore;
        an annular venturi wall surrounding the splitter, the venturi including a cylindrical forward portion defining spaced-apart forward and aft exterior mounting surfaces, the forward exterior mounting surface is located at a forward-most edge of the cylindrical forward portion and
        a row of first vanes extending between the splitter and the venturi wall, wherein the row of first vanes is axially located at the forward-most edge of the annular venturi wall and the cylindrical forward portion of the annular splitter, and connects the annular splitter to the annular venturi;
    wherein the venturi is of a unitary construction;
    a swirler comprising:
        a hub with upstream and downstream ends, a second bore at the upstream end, and a pilot fuel outlet at the downstream end;
        a row of second vanes extending outward from the hub;
        an annular rim surrounding the upstream end of the hub, defining an air flow passage between the rim and the hub, and a forward interior mounting surface located on a radially inner side of the annular rim; and
        a radially-extending wall interconnecting the hub and the rim;
    wherein the swirler is of a unitary construction;
    wherein:
        the pilot supply tube is received in the second bore;
        outer ends of the inner vanes are received in the first bore of the splitter; and
        the forward and aft exterior mounting surfaces of the venturi are received in the forward and aft interior mounting surfaces, respectively.

2. The apparatus of claim 1 wherein the swirler further comprises a generally annular forward portion disposed forward of the annular rim, the forward portion having a wall section forming a U-shaped slot, and wherein the radially-extending wall is disposed at an intersection of the forward portion and the rim and spans across the U-shaped slot.

3. The apparatus of claim 1 further comprising:
    a centerbody having an annular wall surrounding the distributor ring, the annular wall having upstream and downstream ends, and including an array of first openings passing through the annular wall near the upstream end, each of the first openings aligned with one of the fuel outlets.

4. The apparatus of claim 3 wherein the annular wall of the centerbody includes one or more circumferential rows of second openings passing through the annular wall near the downstream end.

5. The apparatus of claim 1 wherein the venturi wall includes a conical aft portion extending aft from the cylindrical forward portion, and an annular heat shield disposed at an aft end of the conical aft portion.

6. The apparatus of claim 5 wherein a radial wall is disposed at an aft end of the centerbody, the radial wall including one or more circumferential rows of holes that are oriented to direct cooling air to impinge on the heat shield.

7. The apparatus of claim 1 wherein the fuel distributor is of unitary construction.

8. The apparatus of claim 1 wherein the unitary construction is made by a rapid manufacturing process.

9. The apparatus of claim 1 wherein
    the fuel distributor, the venturi, and the fuel swirler are connected to each other by braze joints.

* * * * *